(12) United States Patent
Abdal et al.

(10) Patent No.: US 11,640,684 B2
(45) Date of Patent: May 2, 2023

(54) ATTRIBUTE CONDITIONED IMAGE GENERATION

(71) Applicants: ADOBE INC., San Jose, CA (US); KING ABDULLAH UNIVERSITY OF SCIENCE AND TECHNOLOGY, Thuwal (SA)

(72) Inventors: Rameen Abdal, Thuwal (SA); Peter Wonka, Thuwal (SA); Niloy Mitra, Hemel Hempstead (GB); Peihao Zhu, Thuwal (SA)

(73) Assignees: ADOBE INC., San Jose, CA (US); KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 324 days.

(21) Appl. No.: 16/934,858

(22) Filed: Jul. 21, 2020

(65) Prior Publication Data
US 2022/0028139 A1  Jan. 27, 2022

(51) Int. Cl.
*G06T 11/60* (2006.01)
*G06V 40/16* (2022.01)

(52) U.S. Cl.
CPC ............ *G06T 11/60* (2013.01); *G06V 40/169* (2022.01)

(58) Field of Classification Search
CPC .. G06V 10/422; G06V 40/169; G06V 10/771; G06T 11/60; G06T 2200/24
See application file for complete search history.

(56) References Cited

U.S. PATENT DOCUMENTS

| | | | |
|---|---|---|---|
| 2018/0225812 A1* | 8/2018 | DiVerdi | G06F 18/23213 |
| 2019/0197670 A1* | 6/2019 | Ferrer | G06V 10/82 |
| 2021/0209464 A1* | 7/2021 | Bala | G06T 11/001 |
| 2021/0256358 A1* | 8/2021 | Deng | G06N 3/0454 |

OTHER PUBLICATIONS

Abdal, et al., "Image2StyleGAN: How to Embed Images Into the StyleGAN Latent Space?", Proceedings of the IEEE International Conference on Computer Vision, 2019, pp. 4432-4441.

(Continued)

*Primary Examiner* — Syed Haider
(74) *Attorney, Agent, or Firm* — F. Chau & Associates, LLC

(57) ABSTRACT

A method, apparatus, and non-transitory computer readable medium for image processing are described. Embodiments of the method, apparatus, and non-transitory computer readable medium include identifying an original image including a plurality of semantic attributes, wherein each of the semantic attributes represents a complex set of features of the original image; identifying a target attribute value that indicates a change to a target attribute of the semantic attributes; computing a modified feature vector based on the target attribute value, wherein the modified feature vector incorporates the change to the target attribute while holding at least one preserved attribute of the semantic attributes substantially unchanged; and generating a modified image based on the modified feature vector, wherein the modified image includes the change to the target attribute and retains the at least one preserved attribute from the original image.

20 Claims, 12 Drawing Sheets

(56) References Cited

OTHER PUBLICATIONS

Aberman, et al., "Deep Video-Based Performance Cloning", Computer Graphics Forum, vol. 38. Wiley Online Library, 2019, pp. 219-233.
Brock, et al., "Large Scale GAN Training for High Fidelity Natural image Synthesis", 2018., arXiv:cs.LG/1809.11096, 35 pages.
Cao, et al., "CariGANs: Unpaired Photo-to-Caricature Translation", ACM Transactions on Graphics 37, 6 (Jan. 2019), pp. 1-14, https://doi.org/10.1145/3272127.3275046.
Chen, et al., "Neural ordinary differential equations", Advances in neural information processing systems, 2018, pp. 6571-6583.
Choi, et al., "StarGAN: Unified Generative Adversarial Networks for Multi-domain Image-to-Image Translation", 2018 IEEE/CVF Conference on Computer Vision and Pattern Recognition (Jun. 2018), 9 pages, https://doi.org/10.1109/cvpr.2018.00916.
Choi, et al., "StarGAN v2: Diverse Image Synthesis for Multiple Domains", 2019, arXiv:cs.CV/1912.01865, 10 pages.
Deng, et al., "ImageNet: A Large-Scale Hierarchical Image Database", CVPR09, 2009, 8 pages.
Fried, et al., "Text-Based Editing of Talking-Head Video", ACM Trans. Graph. 38, 4, Article 68 (Jul. 2019), 14 pages, https://doi.org/10.1145/3306346.3323028.
Geitgey, 2020, GitHub—Face Recognition, Located at: https://github.com/ageitgey/face_recognition.
Goodfellow, et al., "Generative adversarial nets", Advances in neural information processing systems, 2014, pp. 2672-2680.
Grathwohl, et al., "Ffjord: Free-form continuous dynamics for scalable reversible generative models", arXiv preprint arXiv:1810.01367 (2018), 13 pages.
Guérin, et al., "Interactive example-based terrain authoring with conditional generative adversarial networks", ACM Transactions on Graphics (TOG) vol. 36, No. 6 (2017), Article 228, 13 pages.
Guo, et al., "The relightables: volumetric performance capture of humans with realistic relighting", ACM Transactions on Graphics (TOG) vol. 38, No. 6 (2019), Article 217, pp. 1-19.
Härkönen, et al., "GANSpace: Discovering Interpretable GAN Controls", arXiv preprint arXiv:2004.02546 (2020), 29 pages.
He, et al., "Deep residual Seaming for image recognition", Proceedings of the IEEE conference on computer vision and pattern recognition, 2016, pp. 770-778.
Hedman, et al., "Deep blending for free-viewpoint image-based rendering", ACM Transactions on Graphics (TOG) vol. 37, No. 6, Article 257, (2018), pp. 1-15.
Härkönen, et al., "GANSpace: Discovering Interpretable GAN Controls", 2020, arXiv:cs.CV/2004.02546, 29 pages.
Isola, et al., "Image-to-Image Translation with Conditional Adversarial Networks", 2017 IEEE Conference on Computer Vision and Pattern Recognition (CVPR) (Jul. 2017), https://doi.org/10.1109/cvpr.2017.632, 10 pages.
Jiang, et al., "PSGAN: Pose and Expression Robust Spatial-Aware GAN for Customizable Makeup Transfer", arXiv: cs.CV/1909.06956, 2019, 9 pages.
Jo, et al., "SC-FEGAN: Face Editing Generative Adversarial Network With User's Sketch and Color", The IEEE International Conference on Computer Vision (ICCV)., 2019, 9 pages.
Karras, et al., "Progressive Growing of GANs for Improved Quality, Stability, and Variation", arXiv:cs.NE/1710.10196, 2017, 26 pages.
Karras, et al., "A Style-Based Generator Architecture for Generative Adversarial Networks", 2019 IEEE/CVF Conference on Computer Vision and Pattern Recognition (CVPR) (Jun. 2019), https://doi.org/10.1109/cvpr.2019.00453, 10 pages.
Karras, et al, "Analyzing and Improving the Image Quality of StyleGAN", 2019a, arXiv:cs.CV/1912.04958, 10 pages.
Kim, et al., "Deep video portraits", ACM Transactions on Graphics (TOG) vol. 37, No. 4, Article 163, (2018), pp. 1-14.
Kim, et al., "Learning to discover cross-domain relations with generative adversarial networks", Proceedings of the 34th International Conference on Machine Learning—vol. 70, JMLR, org, 2017, pp. 1857-1865.

Kingma, et al., "Auto-Encoding Variational Bayes", arXiv:stat.ML/1312.6114, 2013, 14 pages.
Krause, et al., "3D Object Representations for Fine-Grained Categorization", 4th International IEEE Workshop on 3D Representation and Recognition (3dRR-13), Sydney, Australia, 2013, 8 pages.
Martin-Brualla, et al., "LookinGood: enhancing performance capture with real-time neural re-rendering", arXiv preprint arXiv:1811.05029 (2018), 14 pages.
Microsoft. 2020. Azure Face. Located at: https://azure.microsoft.com/en-in/services/cognitive-services/face/.
Mirza et al., "Conditional Generative Adversarial Nets", ArXiv abs/1411.1784 (2014), 7 pages.
Park, et al., "Semantic Image Synthesis with Spatially-Adaptive Normalization", In Proceedings of the IEEE Conference on Computer Vision and Pattern Recognition, 2019, 10 pages.
Pontryagin, 2018, Mathematical theory of optimal processes. Routledge (book).
Portenier, et al., "Faceshop: Deep Sketch-Based Face Image Editing", ACM Trans. Graph. 37, 4, Article 99 (Jul. 2018), 13 pages. https://doi.org/10.1145/3197517, 3201393, 13 pages.
Radford, et al., "Unsupervised Representation Learning with Deep Convolutional Generative Adversarial Networks", In International Conference on Learning Representations, ICLR. 2016, 16 pages.
Rezende, et al., "Variational inference with normalizing flows", arXiv preprint arXiv:1505.05770 (2015), 10 pgs.
Shen, et al., "Interpreting the Latent Space of GANs for Semantic Face Editing", (2020), 10 pgs.
Shysheya, et al., Textured neural avatars. In Proceedings of the IEEE Conference on Computer Vision and Pattern Recognition, pp. 2387-2397, 2019.
Sitzmann, et al., "Deepvoxels: Learning persistent 3d feature embeddings", In Proceedings of the IEEE Conference on Computer Vision and Pattern Recognition, pp. 2437-2446, 2019.
Tan, et al., "MichiGAN: Multi-Input-Conditioned Hair Image Generation for Portrait Editing", ACM Trans. Graph. 38, 4, Article 31 (Jul. 2020), 13 pgs.
Tewari, et al., "StyleRig: Rigging StyleGAN for 3D Control over Portrait Images", arXiv preprint arXiv:2004.00121 (2020), 10 pgs.
Tewari, et al., "State of the Art on Neural Rendering", Computer Graphics Forum (EG Star 2020) (2020), 27 pgs.
Thies, et al., "Deferred neural rendering: Image synthesis using neural textures", ACM Transactions on Graphics (TOG) 38, 4 (2019), pp. 1-12.
Thies, et al., "Image-guided neural abject rendering", In International Conference on Learning Representations, ICLR. https://openreview, net/forum, 2020, 16 pgs.
Van den Cord, et al., "Conditional Image Generation with PixelCNN Decoders" arXiv:cs.CV/1606.05328, 2016. 9 pgs.
Wang, et al, "High-Resolution image Synthesis and Semantic Manipulation with Conditional GANs", In Proceedings of the IEEE Conference on Computer Vision and Pattern Recognition, 2018, 10 pgs.
Xiao, et al., "ELEGANT: Exchanging Latent Encodings with GAN for Transferring Multiple Face Attributes", In Proceedings of the European Conference on Computer Vision (ECCV), pp. 172-187, 2018.
Xu, et al., "Deep image-based relighting from optimal sparse samples", ACM Transactions on Graphics (TOG) 37, 4 (2018), pp. 1-13.
Yang, et al., "PointFlow: 3D Point Cloud Generation with Continuous Normalizing Flows", arXiv (2019), 10 pgs.
Yi, et al., "Dualgan: Unsupervised dual learning for image-to-image translation", In Proceedings of the IEEE international conference on computer vision, pp. 2849-2857, 2017.
Yu, et al., "LSUN: Construction of a Large-scale image Dataset using Deep Learning with Humans in the Loop", arXiv preprint arXiv:1506.03365 (2015), 9 pgs.
Yu, et al., "Free-Form Image Inpainting with Gated Convolution", arXiv preprint arXiv:1806.03589, (2018), 9 pgs.
Zhou, et al., "Deep Single-Image Portrait Relighting", In International Conference on Computer Vision (ICCV), 2019, 9 pgs.
Zhu, et al., "In-Domain GAN Inversion for Real Image Editing", arXiv:cs.CV/2004.00049, 2020, 31 pgs.

(56) References Cited

OTHER PUBLICATIONS

Zhu, et al., "Generative Visual Manipulation on the Natural Image Manifold", arXiv:cs.CV/1609.03552, 2016, 16 pgs.
Zhu, et al., "Unpaired image-to-image translation using cycle-consistent adversarial networks", In Proceedings of the IEEE international conference on computer vision, pp. 2223-2232, 2017a.
Zhu, et al., "Toward multimodal image-to-image translation", In Advances in Neural Information Processing Systems, 2017b., 12 pgs.
Zhu, et al., "SEAN: Image Synthesis with Semantic Region-Adaptive Normalization", arXiv preprint arXiv:1911.12861, (2019), 10 pgs.

* cited by examiner

ATTRIBUTE CONDITIONED IMAGE GENERATION

BACKGROUND

The following relates generally to image processing, and more specifically to editing image attributes.

Digital image processing refers to the use of a computer to edit a digital image using an algorithm or processing network. In some examples, an image is processed using image editing software. One common use for image editing software is to edit images of people, such as photographs of people taken using a mobile electronic device. With the wide availability of cameras in smart phones and other mobile electronic devices, many people capture and edit such photographs.

However, some editing techniques are beyond the skills of an ordinary user. For example, changing the attributes of an image such as pose, facial expression, lighting, age, or gender can require significant skill using conventional image editing applications. Therefore, there is a need in the art for improved systems and methods to automatically change attributes of an image.

SUMMARY

The present disclosure describes systems and methods for altering target attributes of an image while preserving other attributes that are not targeted for change. Embodiments of the disclosure generate a modified feature vector representing the target attributes using a mapping function based on a non-linear function of a latent vector representing the image, the target attributes, and the preserved attributes. Then, a modified image is generated based on the modified feature vector.

A method, apparatus, and non-transitory computer readable medium for image processing are described. Embodiments of the method, apparatus, and non-transitory computer readable medium include identifying an original image including a plurality of semantic attributes, wherein each of the semantic attributes represents a complex set of features of the original image; identifying a target attribute value that indicates a change to a target attribute of the semantic attributes; computing a modified feature vector based on the target attribute value, wherein the modified feature vector incorporates the change to the target attribute while holding at least one preserved attribute of the semantic attributes substantially unchanged; and generating a modified image based on the modified feature vector, wherein the modified image includes the change to the target attribute and retains the at least one preserved attribute from the original image.

A method, apparatus, and non-transitory computer readable medium for image processing are described. Embodiments of the method, apparatus, and non-transitory computer readable medium identify an original feature vector representing a plurality of original attributes, identify a plurality of original attribute values corresponding to the original attributes, compute a latent vector based on the original feature vector and the original attribute values, wherein the latent vector is computed using an inverse of a mapping network, identify one or more target attribute values corresponding to one or more target attributes, wherein the target attributes correspond to a subset of the original attributes and one or more preserved attribute values correspond to a remaining subset of the original attributes that do not correspond to the target attributes, compute a modified feature vector based on the latent vector using the mapping network, wherein the mapping network comprises a non-linear dependency on the target attribute values and the preserved attribute values, and generate a modified image based on the modified feature vector, wherein the modified image includes the target attributes and the remaining subset of the original attributes.

An apparatus for image processing is described. Embodiments of the apparatus include a mapping network configured to produce a feature vector based on a latent vector and a plurality of attribute values, wherein the mapping network comprises a non-linear function dependency on the attribute values and a generator network configured to generate an image based on the feature vector, wherein the image includes attributes corresponding to the attribute values.

DETAILED DESCRIPTION

Figure 1:
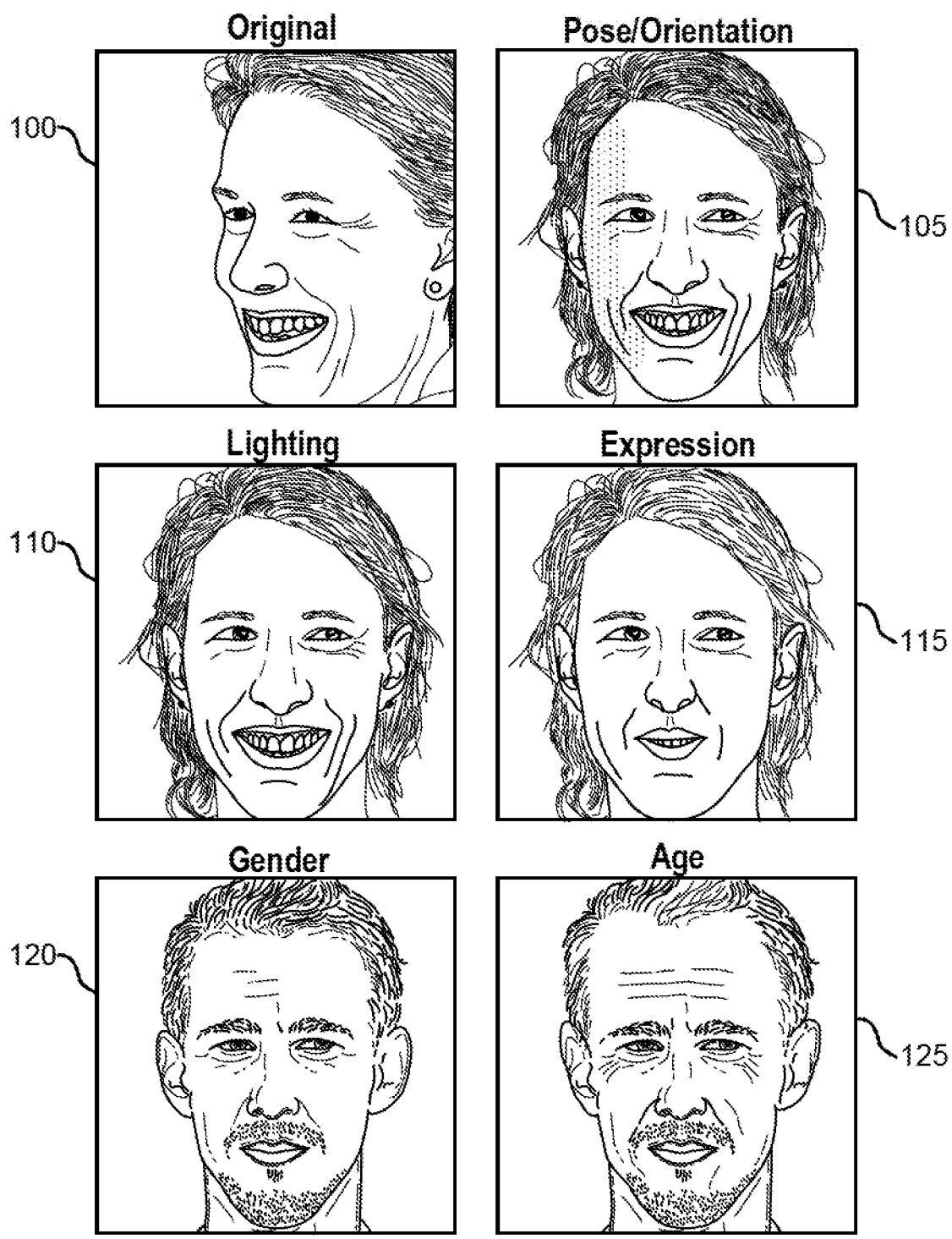
FIG. 1 shows an example of portrait image attribute modification according to aspects of the present disclosure.

The present disclosure relates to image processing, and more specifically to editing certain image attributes while preserving others. Image editing applications sometimes include tools that enable a user to automatically alter certain elements of on image. For example, when editing an image of a face, the user can modify skin tones or eye color. However, certain complex attributes, such as modified facial expressions, age, gender, or pose, can be more difficult to modify.

Computer graphics systems are used to generate realistic images that can be controlled using user-specified attributes. One approach is to create detailed 3D models, decorate them with custom materials and texture properties, and render them using realistic camera and illumination models. Such an approach provides users with significant control over a range of attributes such as object properties, camera position, and illumination. However, conventional methods have difficulty in achieving photorealism over a range of attribute specifications.

Certain neural networks, such as generative adversarial networks (GANs), have been developed that can generate realistic images of faces and other objects. In some cases, a GAN includes a mapping network for generating a feature vector, and a generator network for transforming the feature vector into an image. Changing the feature vector can result in changes to attributes of the image. For example, each attribute change can be associated with a vector transformation that takes one feature vector to another. According to a previous technique, the same transformation independent of the image being transformed. However, since GANs encode image attributes in a complex way, changing the feature vector can result in inadvertent changes to other attributes of the image.

For example, if an image of a face is changed from one facial expression (e.g., smiling) to another facial expression (e.g., frowning), other facial features of the image can be changed such that the modified image is no longer a faithful representation of the person in the original image. These undesired changes occur due to the way features of the image are encoded. Specifically, visible features such as facial expression, age, and gender are encoded in a complex, interdependent way that is different for every image. Thus, changing one feature can change the essential identity of the image and render the modified image unsuitable for the intended use.

Therefore, embodiments of the present disclosure include systems and methods that can alter complex attributes of an image (e.g., a portrait of a person) while preserving other attributes that are not targeted for change (e.g., facial structure or other attributes representing the identity of the person in the image). For example, embodiments of the disclosure generate a modified feature vector representing the target attributes using a mapping function that implements a non-linear transformation. That is, instead of applying a same vector transformation for changing a given attribute to different images, the changes to the feature vectors depend on other attributes of the original image.

Therefore, embodiments of the present disclosure enable users to automatically modify complex attributes of an image while preserving other complex attributes. This enables a casual user to perform image editing processes in seconds, where previously those changes would take a highly skilled user hours to perform.

Semantic Attributes

FIG. 1 shows an example of portrait image attribute modification according to aspects of the present disclosure. The example shown includes original image 100, wherein such image is modified by attributes such as modified pose 105, modified lighting 110, modified expression 115, modified gender 120, and modified age 125. Original image 100 is an example of, or includes aspects of, the corresponding element or elements described with reference to FIGS. 2, 4, and 9.

As illustrated in the present example, an image of a person includes multiple semantic attributes such as pose, lighting, expression, gender, age, etc., that represent a complex set of features (i.e., curves, colors, etc.) in an image. In the context of a neural network for generating images, these attributes are represented by combinations of many different values in a feature vector. The combination of vector values representing any particular attribute, or attribute change, depends on other attributes in a non-linear way (i.e., the values that are modified to achieve a change in the target attribute depend on attributes that are not being changed).

In some cases, a generative adversarial network (GAN) is trained to generate images. For example, a neural network based on the StyleGAN architecture can produce images with a high level of photorealism based on random latent vectors. However, StyleGAN by itself does not provide users a means of controlling the generation process with adjustable attribute specifications. For example, starting from a StyleGAN-generated face, users are not able to edit the image to change the pose (i.e., camera), illumination, or the person's expression. Thus, one embodiment of the present disclosure provides a modified StyleGAN architecture that enables users to edit complex attributes while preserving other attributes of an image.

In some examples, conditional GANs are used to enable partial edit controls. In these examples, attributes are typically specified directly at training time. Thus, conditional GANs provide a level of semantic attribute control. However, attributes which were not specified at training time sometimes change across the generated images, and hence result in loss of object identity.

Due to the challenge of specifying multiple complex attributes, conventional methods are not suitable for controlling the generation process using semantic attributes such as those illustrated in FIG. 1, while still preserving the quality of the output (e.g., the identity of the individual in the portrait, or other complex semantic attributes). For example, due to the entangled nature of the latent space in a GAN, performing edits along one attribute results in unwanted changes along other attributes. In the context of conditional exploration of entangled latent spaces, some exemplary embodiments of the present disclosure are related to attribute-conditioned sampling and attribute-controlled editing.

Using the systems and methods described herein, complex attributes of an original image 100 are modified while preserving other attributes, including attributes representing the identity of a person in the image. For example, modified pose 105 illustrates a change in the orientation of the original image 100, modified lighting 110 represents a change in lighting conditions, modified expression 115 illustrates a change in the facial expression, modified gender 120 shows a change in gender, and modified age 125 shows a change in age.

In some examples, multiple target attributes are changed sequentially. In one example, the image representing the modified age 125 includes elements of the modified pose 105, the modified lighting 110, the modified expression 115, and the modified gender 120, as well as attributes essential to the original image 100. In other examples, multiple target attributes are changed simultaneously.

Figure 2:
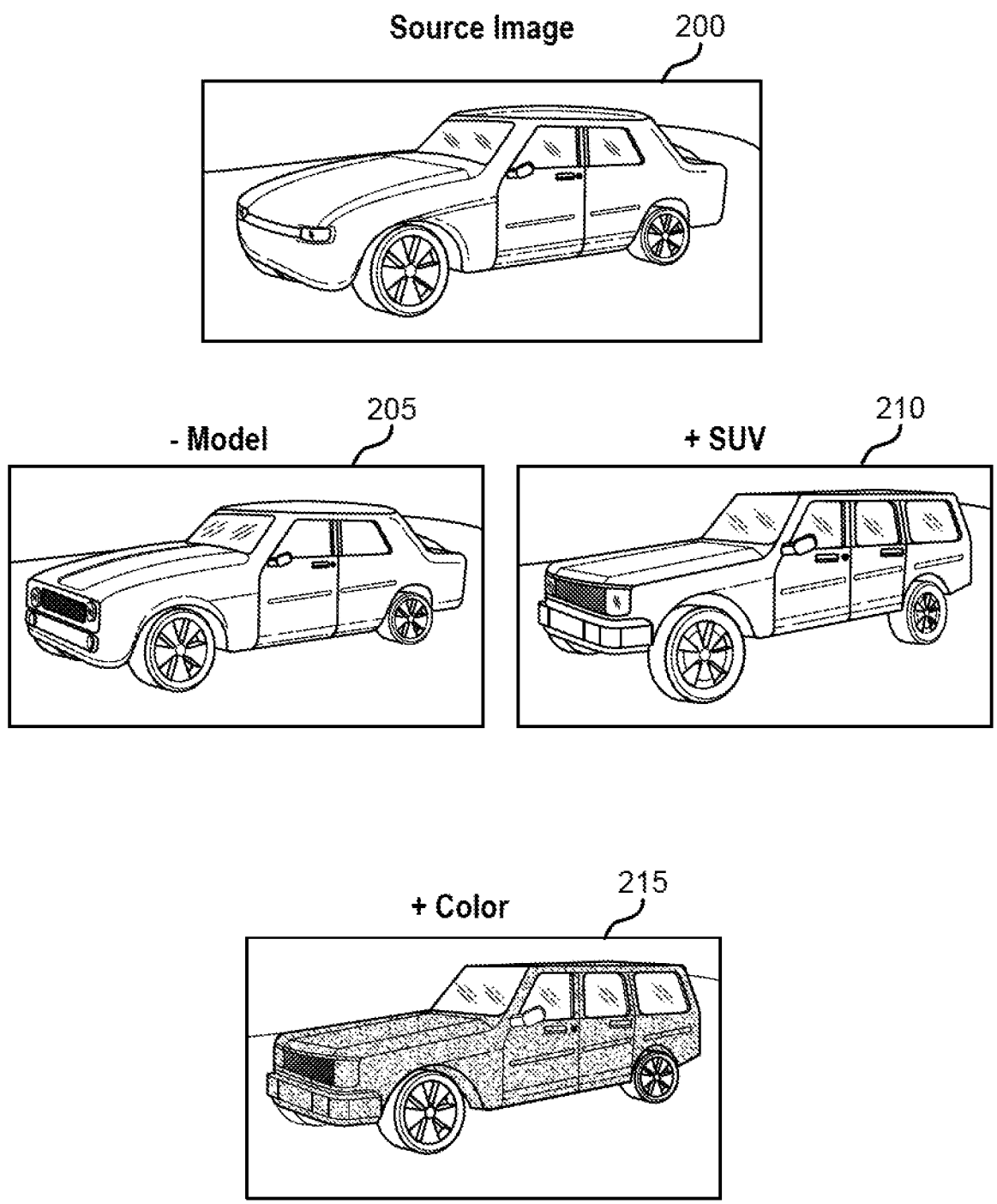
FIG. 2 shows an example of vehicle image attribute modification according to aspects of the present disclosure.

In one example, the described methods and the network are evaluated using a headshot image as shown in FIG. 1, a vehicle as shown in FIG. 2, or any other object latent space. Fine-grained disentangled edits are demonstrated along various attributes. For example, attributes vary for faces, including camera pose, illumination variation, expression, skin tone, gender, and age.

FIG. 2 shows an example of vehicle image attribute modification according to aspects of the present disclosure. As shown, the systems and methods of the present disclosure are not limited to modifying facial attributes. Thus, the example shown includes original image 200 (i.e., a vehicle), modified model 205, modified type 210, and modified color 215. Original image 200 is an example of, or includes aspects of, the corresponding element or elements described with reference to FIGS. 1, 4, and 9.

As in the portrait example of FIG. 1, embodiments of the present disclosure are used to modify an image of a vehicle while retaining other attributes and aspects of the essential identity of the vehicle. Thus, modified model 205 represents a change to the model of the vehicle, modified type 210 represents the vehicle in a sport utility form, and modified color 215 represents the vehicle in another color. The example shown in FIG. 2 represents a series of changes to individual attributes that are made to the original image 200 in sequence order. However, in other examples, multiple target attributes are changed simultaneously.

System Overview

Figure 3:
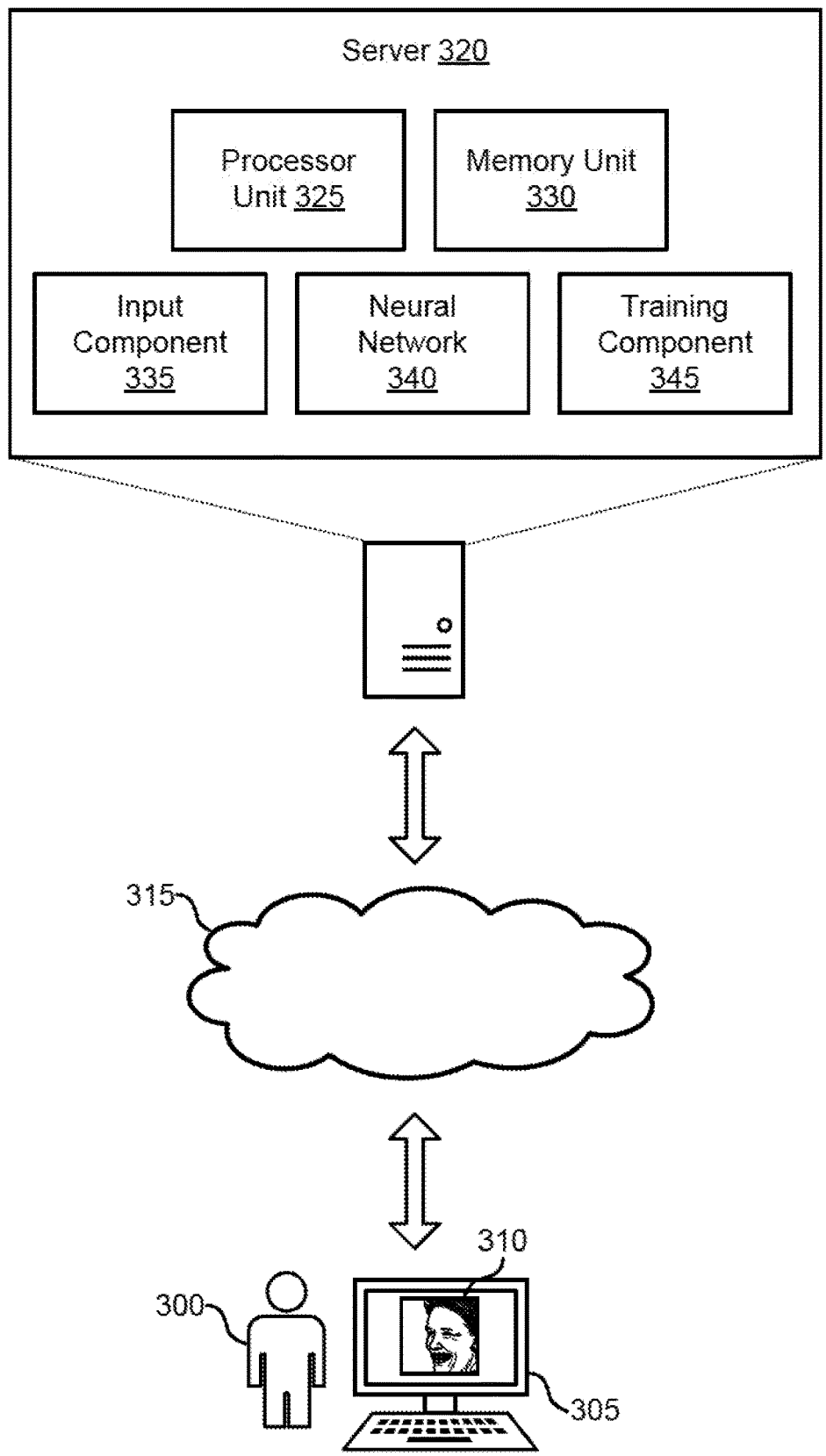
FIG. 3 shows an example of a system for image processing according to aspects of the present disclosure.

FIG. 3 shows an example of a system for image processing according to aspects of the present disclosure. The example shown includes user 300, user device 305, cloud 315, and server 320. User device 305 includes image editing application 310. As illustrated in FIG. 3, the server 320 includes processor unit 325, memory unit 330, input component 335, neural network 340, and training component 345. However, in other examples, the neural network 340 and other components located on server 320 are located on the user device 305.

The user 300 edits an image using an image editing application 310 on the user device 305. The image editing application 310 receives input from a user 300 indicating the image to be edited, along with a target attribute value to be changed. The image editing application 310 then communicates with server 320 (or perform functions locally) to generate a modified version of the image that includes changes to the target attribute indicated by the user 300. Then, the image editing application 310 displays the modified image to the user 300. An example of an image editing application 310 is described in further detail with reference to FIG. 4.

Some embodiments of the present disclosure are directed to attribute-conditioned sampling, where the system is configured to sample a diverse set of images that meet user-specified attribute(s). That is, in some cases a user 300 selects attributes and the server 320 selects the image based on the attributes. According to other embodiments, a user 300 provides an image and the server 320 provides attribute-controlled editing, where the user 300 can edit the image with target attribute specifications. In some cases, a user 300 may perform multiple edits to the same image sequentially.

In some examples, the original image includes an image of a face, and the original attributes include a facial expression, an orientation, an age, a lighting property, a gender, a hairstyle, or any combination thereof. In some cases, the target attributes correspond to a subset of the original attributes and one or more preserved attribute values correspond to a remaining subset of the original attributes that do not correspond to the target attributes. In other words, some attributes are targeted for changing, and others are preserved.

A processor unit 325 of the server 320 includes an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some examples, a processor includes special purpose components for modem processing, baseband processing, digital signal processing, or transmission processing.

A memory unit 330 stores information for various programs and applications on a computing device. For example, the storage includes data for running an operating system. The memory includes both volatile memory and non-volatile memory. Volatile memory includes random access memory (RAM), and non-volatile memory includes read-only memory (ROM), flash memory, electrically erasable programmable read-only memory (EEPROM), digital tape, a hard disk drive (HDD), and a solid state drive (SSD). Memory includes any combination of readable and/or writable volatile memories and/or non-volatile memories, along with other possible storage devices.

Input component 335 identifies an original image including a set of original attributes, where the original attributes include semantic features of the original image. For example, the input component 335 receives the original image from the image editing application 310. Alternatively, the input component is a part of the image editing application 310.

Input component 335 also identifies a target attribute value for modifying the original image, where the target attribute value represents a target attribute different from a corresponding original attribute of the original image. In some cases, input component 335 identifies an original feature vector representing the original attributes. In some examples, the original image is generated based on the original feature vector. In other examples, the original feature vector is generated based on the original image.

In some embodiments, the server 320 or the user device 305 includes an artificial neural network (ANN). An ANN is a hardware or a software component that includes a number of connected nodes (a.k.a., artificial neurons), which loosely corresponds to the neurons in a human brain. Each connection, or edge, transmits a signal from one node to another (like the physical synapses in a brain). When a node receives a signal, it can process the signal and then transmit the processed signal to other connected nodes. In some cases, the signals between nodes comprise real numbers, and the output of each node are computed by a function of the sum of its inputs. Each node and edge is associated with one or more node weights that determine how the signal is processed and transmitted.

In some embodiments, a StyleGAN architecture is used as a baseline and attribute-based user manipulations is treated as finding corresponding non-linear paths in the latent vector space. For example, in certain embodiments, the neural network 340 includes a mapping network configured to perform joint encoding of multiple complex attributes, such that some attributes are changed in manner that depends on other attributes that are preserved. The neural network 340 may also include a generator network configured to generate images based on the output of the mapping network. Further detail regarding a StyleGAN-based architecture is described with reference to FIG. 7.

A generative adversarial network (GAN) is a category of ANN where two neural networks are trained based on a contest with each other. Given a training set, the network learns to generate new data with similar properties as the training set. For example, a GAN trained on photographs can generate new images that look authentic to a human observer. GANs are used in conjunction with supervised learning (i.e., using labeled training data), unsupervised learning (i.e., without labeled training data), semi-supervised learning (i.e., using partially labeled data), and reinforcement learning (i.e., based on a reward function).

In some examples, a GAN includes a generator network and a discriminator network. The generator network generates candidates while the discriminator network evaluates them. The generator network learns to map from a latent space to a data distribution of interest, while the discriminator network distinguishes candidates produced by the generator from the true data distribution. The generator network's training objective is to increase the error rate of the discriminator network (i.e., to produce novel candidates that the discriminator network classifies as real).

Some examples of GAN architecture include Progressive-GAN, StyleGAN and StyleGAN2, all of which are used in human face synthesis. Other GAN architecture such as BigGAN that produce good results on the ImageNet dataset. In one embodiment of the present disclosure, the network framework builds on StyleGAN or StyleGAN2 architecture.

In some examples, conditional GANs (CGAN) are also used for image manipulation. For example, to add conditional information as input, CGANs learn a mapping G:x, z→y from an observed input x and a randomly sampled vector z to an output image y. One class of CGANs uses images as conditioning information, such as pix2pix, BicycleGAN, pix2pixHD, SPADE, and SEAN. CGANs are trained even with unpaired training data using cycle-consistency loss. In some cases, CGANs are used as a building block for image editing, for example, by using a generator G to translate a line drawing or semantic label map to a realistic-looking output image. CGANs have given rise to many application specific modifications and refinements.

Another example architecture called StarGAN uses a GAN architecture that considers face attributes such as hair color, gender, and age. GANs (e.g., FaceShop and SC-FEGAN) are also be used conditioned on sketches and color information to fill in regions in a facial image. These GANs use masks to restrict the generation of content to a predefined region. In some cases, conditioning on sketches produces good results for terrain modeling. Specialized image manipulation techniques, such as makeup transfer PSGAN or hair editing are also be useful for editing faces. In some examples, a style transfer technique includes the transformation of input photographs to obtain caricatures where the input and output images are geometrically deformed.

Another approach to conditional GANs is to manipulate latent codes of a pretrained GAN. For example, semantic editing operations are achieved by first computing a difference vectors between two latent codes (e.g., a latent code for a person with beard and a latent code for a person without beard) and then adding this difference vector to latent codes of other people (e.g., to obtain an editing operation that adds a beard). According to embodiments of the present disclosure, latent codes of a pre-trained GAN is manipulated. For example, a StyleRig network transfers face rigging information as a method to control face manipulations in the latent space.

In some cases, a StyleRig network achieves the transfer of overall pose (rotation) and illumination. Another example network called InterFaceGAN finds the latent space vectors that correspond to meaningful edits. GANSpace takes a data driven approach and uses PCA to learn the most important directions. Both examples indicate that the latent space vectors corresponds to meaningful semantic edits. However, as described herein, significantly better results are achieved with a non-linear model of the latent space.

In some examples, images are embedded into the latent space of a GAN. Generally, there are three main techniques. The first technique is to build an encoder network that maps an image into the latent space. The second technique is to use an optimization algorithm to iteratively improve a latent code so that it produces the output image. The third technique is to combine the two techniques and first use an encoder network to obtain an approximate embedding and then refine it with an optimization algorithm. One embodiment of the present disclosure applies an optimization-based technique. In addition, embedding itself is used for GAN-supported image modifications.

In some embodiments, neural rendering techniques are also used to generate images from a scene description using a neural network. Neural rendering techniques include novel view synthesis, relighting under novel lighting conditions, animating faces, and animating bodies in novel poses.

In addition to GANs, other generative models that are used include Variational Autoencoders (VAEs) or a pixelCNN architecture. An autoencoder is a type of ANN used to learn efficient data encoding in an unsupervised manner. The aim of an autoencoder is to learn a representation (encoding) for a set of data, i.e. for dimensionality reduction, by training the network to ignore signal "noise".

According to an exemplary embodiment of the present disclosure, a normalizing flow-based technique is used to conditionally sample from the latent space. First, sample pairs linking latent variables with attributes of the corresponding images are generated. According to an example, a range of attributes are taken into account including camera, illumination, expression, gender, and age for human faces. In another example, camera, type, and color for cars. Adaptive latent space vector manipulation is realized by casting the conditional sampling problem in terms of conditional normalizing flows using the attributes for conditioning. The normalizing flow-based technique does not require attribute information during GAN training. This results in a simple yet robust attribute-based image editing framework.

In some cases, the described methods are used to perform edits on human faces, and present a range of high-quality identity-preserving edits at an unmatched quality. Sequential edits are performed to the images without forcing the latent vectors out of the distribution, using the formulation of the problem with normalizing flows. Therefore, embodiments of the present invention improve identity preservation, both quantitatively and qualitatively. That is, embodiments of the present disclosure present conditional exploration of latent spaces of unconditional GANs using conditional normalizing flows based on complex semantic attributes.

Training component 345 is used to train the neural network 345. During the training process, network weights are adjusted to improve the accuracy of the result (i.e., by minimizing a loss function which corresponds to the difference between the current result and the target result). The weight of an edge increases or decreases the strength of the signal transmitted between nodes. In some cases, nodes have a threshold below which a signal is not transmitted at all. In some examples, the nodes are also aggregated into layers. Different layers perform different transformations on their inputs. The initial layer is known as the input layer and the last layer is known as the output layer. In some cases, signals traverse certain layers multiple times. In one embodiment the neural network 340 is trained using images of human faces. In another embodiment, the neural network 340 is trained using images of vehicles.

Figure 4:
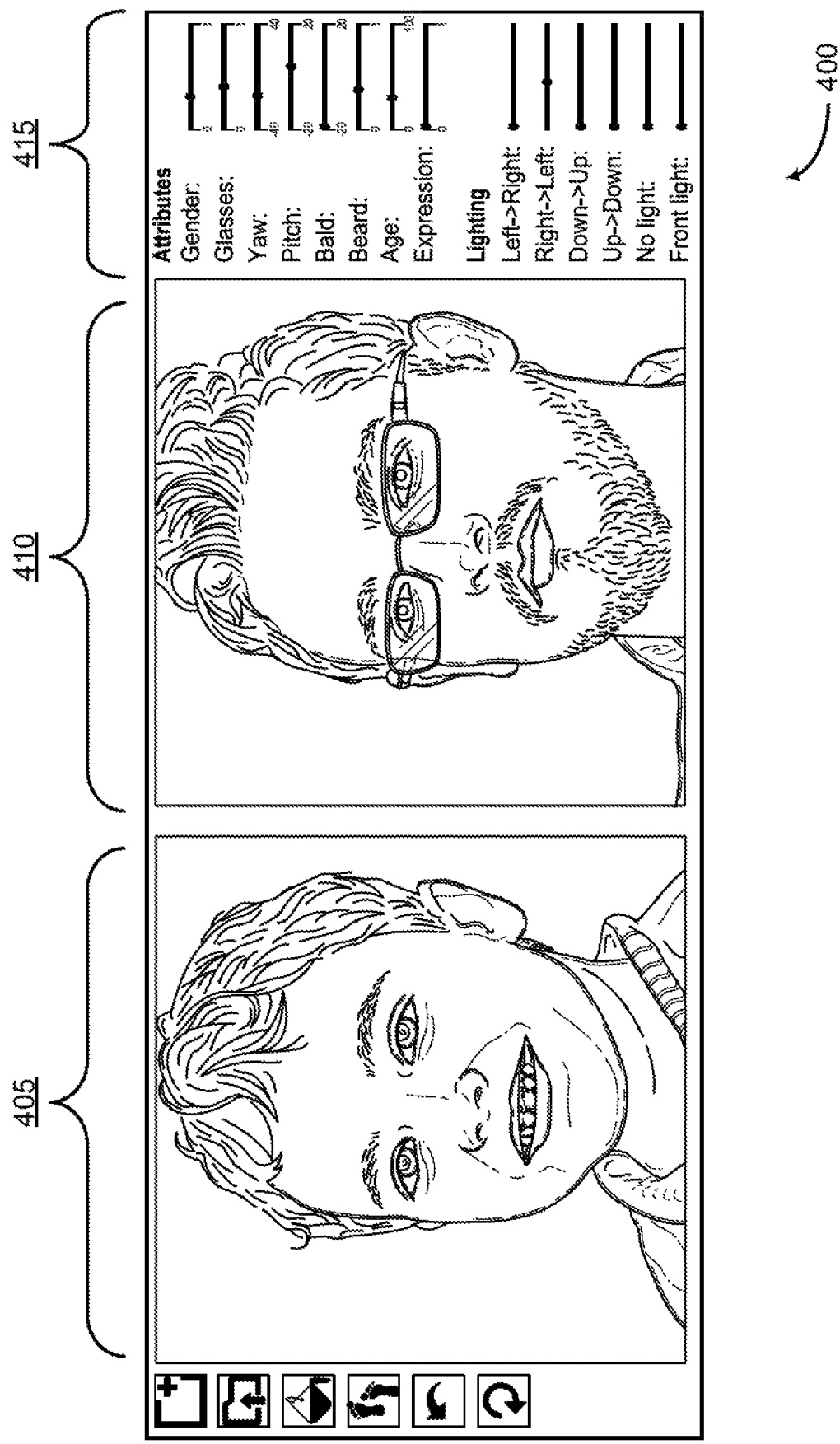
FIG. 4 shows an example of an image editing application according to aspects of the present disclosure.

FIG. 4 shows an example of an image editing application 400 according to aspects of the present disclosure. Image editing application 400 includes original image 405, modified image 410, and one or more attribute selectors 415, and is an example of, or includes aspects of, the corresponding element or elements described with reference to FIG. 3.

As shown in FIG. 4, an image editing application 400 stores a copy of an original image 405, while allowing a user to make edits using attribute selectors 415, resulting in modified image 410. For example, a user edits the gender, age, glasses, orientation, facial hair, expression, and lighting of the original image. Attributes not selected or changed by the user are preserved during the change. In one example, as illustrated, sliders are bused to select the target attributes, but any suitable form for information input can be used (e.g., input fields, dials, verbal commands, etc.).

Thus, an image editing UI is used that allows the user to select a given real or generated image and perform various edits with the help of interactive sliders. The checkpoint images are saved in a panel so that a user can revisit the changes made during the interactive session.

Original image 405 is an example of, or includes aspects of, the corresponding element or elements described with reference to FIGS. 1, 2, and 9. Modified image 410 is an example of, or includes aspects of, the corresponding element or elements described with reference to FIG. 11.

Figure 5:
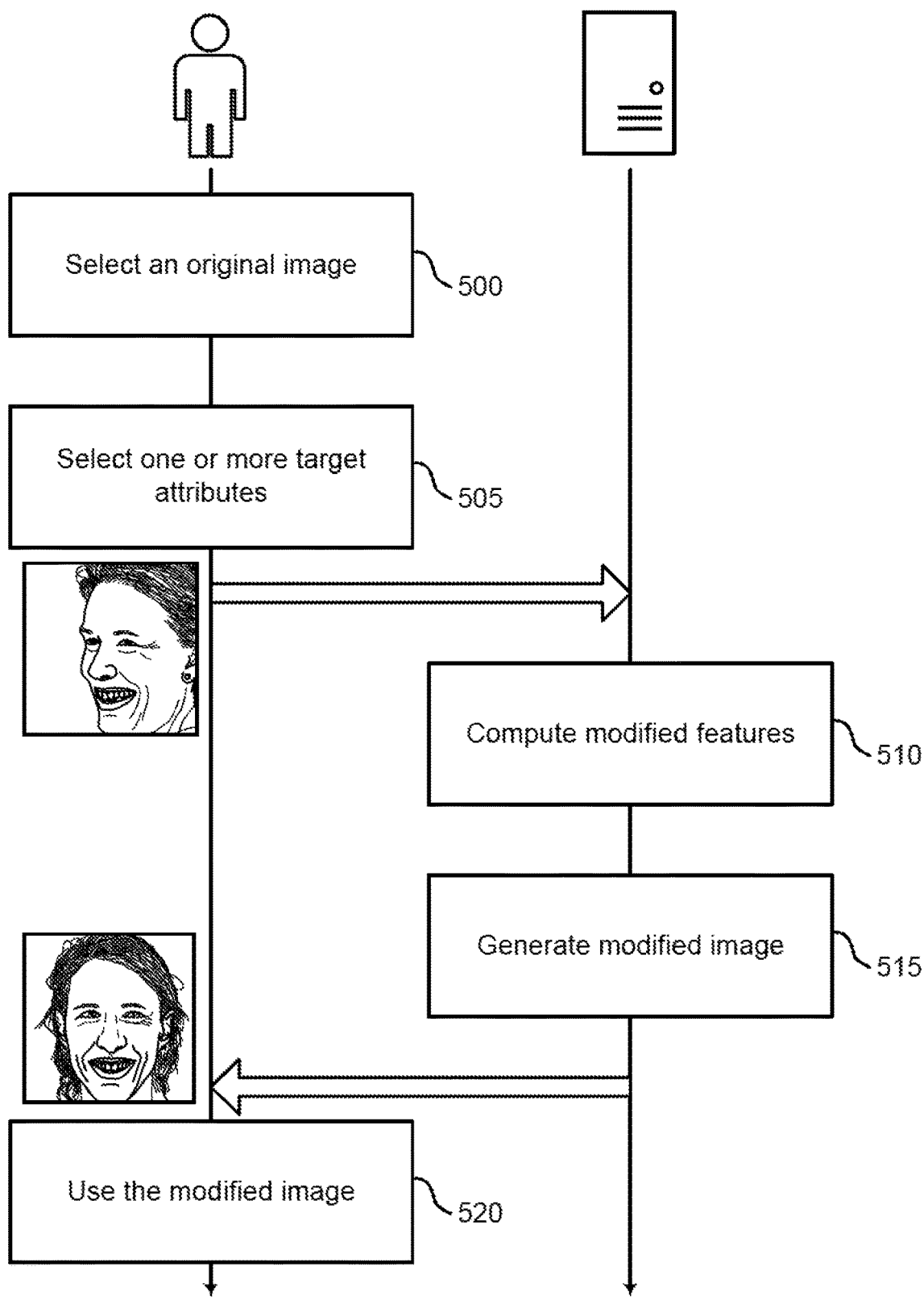
FIG. 5 shows an example of a method of editing an image according to aspects of the present disclosure.

FIG. 5 shows an example of a method of editing an image according to aspects of the present disclosure. Generally, these operations are performed according to the methods and processes described in accordance with aspects of the present disclosure. For example, the operations are composed of various substeps, or are performed in conjunction with other operations described herein.

At operation 500, a user selects an original image. For example, the user selects an image of a face as shown in FIG. 1, or of a vehicle as shown in FIG. 2. At operation 505, the user selects one or more target attributes. For example, the user modifies the gender, age, glasses, orientation, facial hair, expression, and lighting of the original image using input elements of an image editing application as illustrated in FIG. 4.

At operation 510, the system computes modified features that change the target attributes selected by the user while preserving other attributes not selected by the user. For example, the user changes the gender of a person in an image while preserving the age and underlying facial structure.

The target attributes and the preserved attributes are represented in a complex way in the modified features. That is, feature vectors that represent the various attributes of an image represent them using values that are interconnected in a complex way. For example, if a system were to apply the same vector addition process to change the expression of different images, at least one of the images would be modified in other ways (that is, other attributes are not preserved). Thus, embodiments of the present disclosure compute the modified feature vector using a mapping function that depends in a non-linear way on the original image (i.e., the way that the vector is changed when a target attribute is changed depends on other attributes that are not changed).

At operation 515, the system generates a modified image. For example, a neural network generates a modified image by decoding the modified feature vector. At operation 520, the user uses the modified image. In some cases, the user performs subsequent edits using the same or different editing tools in an image editing application.

Figure 6:
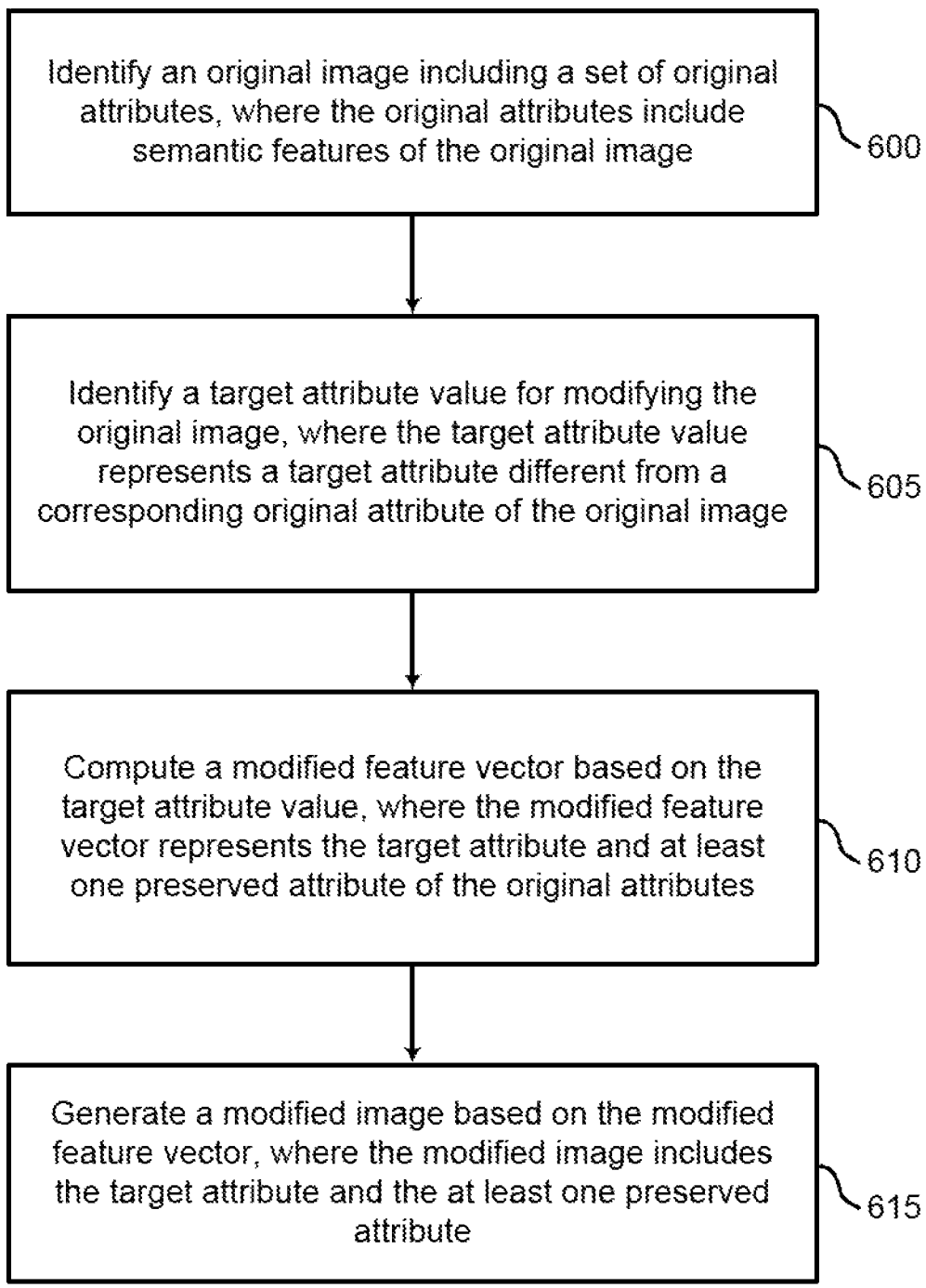
FIG. 6 shows an example of a method of image processing according to aspects of the present disclosure.

FIG. 6 shows an example of a method of image processing according to aspects of the present disclosure. In some examples, these operations are performed by a system including a processor executing a set of codes to control functional elements of an apparatus. Additionally or alternatively, the processes are performed using special-purpose hardware. Generally, these operations are performed according to the methods and processes described in accordance with aspects of the present disclosure. For example, the operations are composed of various substeps, or are performed in conjunction with other operations described herein.

At operation 600, the system identifies an original image including a set of original attributes, where the original attributes include semantic features of the original image. In some cases, the operations of this step refer to, or are performed by, an input component as described with reference to FIG. 3.

At operation 605, the system identifies a target attribute value for modifying the original image, where the target attribute value represents a target attribute different from a corresponding original attribute of the original image. In some cases, the operations of this step refer to, or are performed by, an input component as described with reference to FIG. 3.

At operation 610, the system computes a modified feature vector based on the target attribute value, where the modified feature vector represents the target attribute and at least one preserved attribute of the original attributes. In some cases, the operations of this step refer to, or are performed by, a mapping network as described with reference to FIGS. 7, 9, and 11.

At operation 615, the system generates a modified image based on the modified feature vector, where the modified image includes the target attribute and the at least one preserved attribute. In some cases, the operations of this step refer to, or are performed by, a generator network as described with reference to FIGS. 7, 9, and 11.

Neural Network

Figure 7:
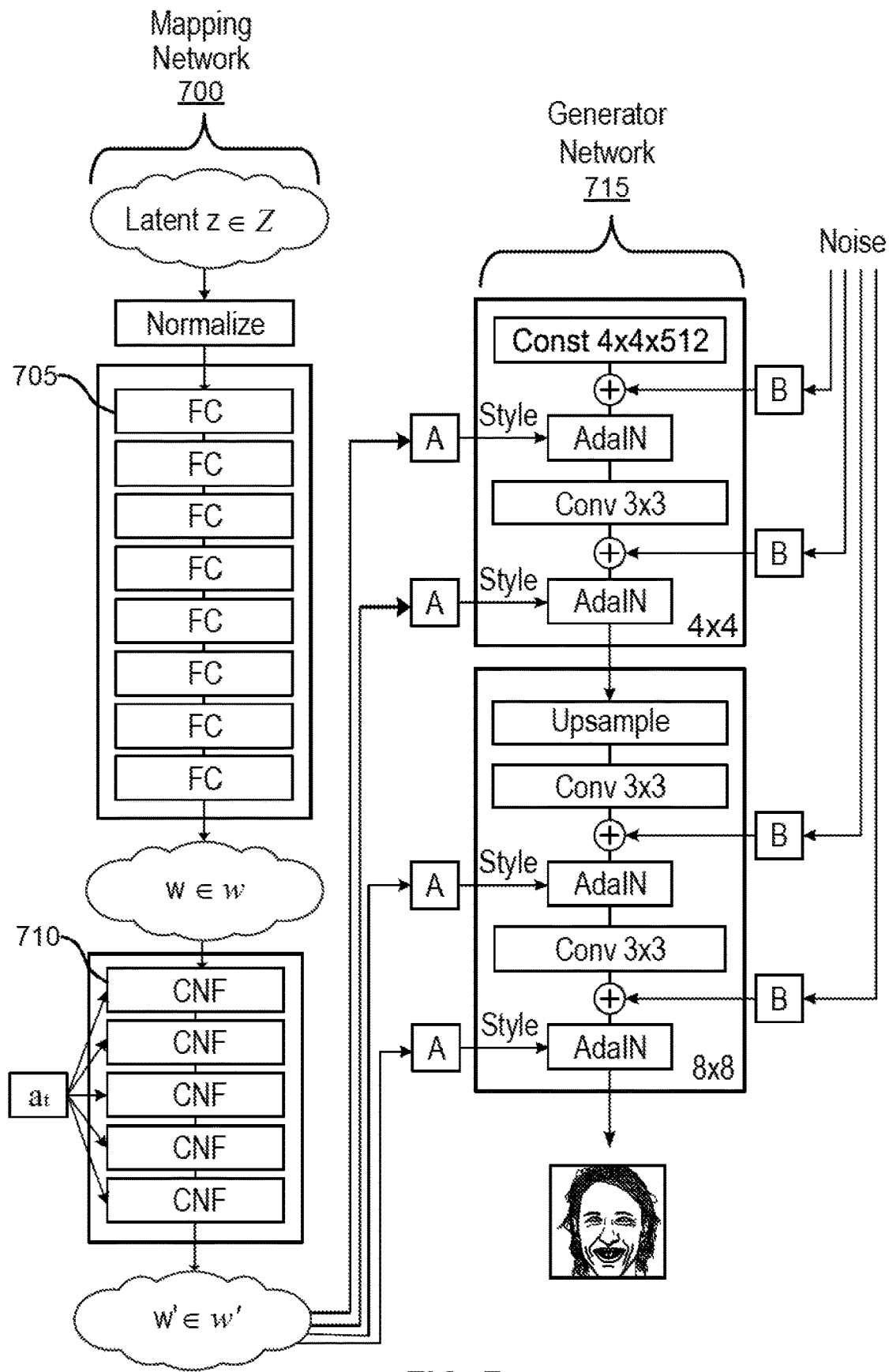
FIG. 7 shows an example of a neural network for image processing according to aspects of the present disclosure.

FIG. 7 shows an example of a neural network for image processing according to aspects of the present disclosure. Neural network is an example of, or includes aspects of, the corresponding element or elements described with reference to FIG. 3, and includes mapping network and generator network 715.

As shown in FIG. 7, one example of the neural network includes components based on a GAN architecture such as StyleGAN. According to an embodiment of the present disclosure, continuous normalizing flow (CNF) blocks 710 are added to the StyleGAN. The CNF blocks are configured to transform a feature vector based on a non-linear dependency of multiple image attributes. An example of a CNF block 710 is described in further detail with reference to FIG. 8.

In other embodiments (not shown) the neural network is based on another architecture such as a variational autoencoder (VAE). For example, the neural network does not necessarily include all of the elements depicted in the generator network 715. Thus, in some examples, the mapping network and the generator network are components of a generative adversarial network (GAN). In some other examples, the mapping network and the generator network are components of a VAE.

Along with the reduction side (i.e., the mapping network 700), a reconstructing side (i.e., generator network 715) is also to be learned. The reconstructing network tries to generate, from the reduced encoding, a representation as close as possible to the original input. Several variants exist to the basic model, with the aim of forcing the learned representations of the input to assume useful properties. Examples include regularized autoencoders (Sparse, Denoising and Contractive autoencoders), which can be effective in learning representations for subsequent classification tasks, and VAEs, which are useful as generative models. In some cases, VAE's operate by making assumptions concerning the distribution of latent variables. The variational approach for latent representation learning results in an additional loss component and a specific estimator for the training algorithm called the Stochastic Gradient Variational Bayes (SGVB) estimator.

Mapping network 700 computes modified feature vectors based on target attribute values, where the modified feature vector represents the target attribute and at least one preserved attribute of a set of original attributes. In some examples, the original attributes are identified using an attribute classifier. In some embodiments, the mapping network 700 includes fully connected layers 705 and one or more continuous normalizing flow (CNF) blocks 710. The CNF blocks 710 includes a non-linear dependency among multiple image attributes. In some examples, the mapping network 700 is trained jointly on the set of attributes. Thus, the mapping network 700 includes a non-linear dependency on the target attribute values and the preserved attribute values In some example, the inverse of the mapping network 700 is used to compute a latent vector based on an original feature vector and the original attribute values. In other words, the mapping network 700 implements an invertible function from a latent vector space to a feature vector space.

Mapping network 700 computes the modified feature vector based on the latent vector using the mapping network 700. In some examples, the mapping network 700 is configured to enable changing target attributes while preserving the remaining subset of the original attributes by correcting for interconnection among the original attributes in the latent vector based on the non-linear dependency.

Mapping network 700 is an example of, or includes aspects of, the corresponding element or elements described with reference to FIGS. 9 and 11, and includes fully connected layer 705 and CNF blocks 710. An example CNF block 710 is described in further detail below with reference to FIG. 8.

Generator network 715 generates a modified image based on the modified feature vector, where the modified image includes the target attribute and the at least one preserved attribute (e.g., a remaining subset of the original attributes). In some cases, generator network 715 is configured to generate an original image based on an original feature vector, wherein the original image includes original attributes. Generator network 715 is an example of, or includes aspects of, the corresponding element or elements described with reference to FIGS. 9 and 11.

According to embodiments of the present disclosure, a neural network conducts attribute-conditioned sampling and attribute-controlled editing. Attribute-conditioned sampling includes sampling high-quality realistic images with target attributes. Attribute-controlled editing includes editing given images such that the edited images have the target attributes, while best preserving the identity of the source images. Sampling from both StyleGAN and StyleGAN2 is supported, as well as other GAN and non-GAN networks.

Image Modification Model

Embodiments of the present disclosure map latent space samples (e.g., $z_s \in \mathbb{R}^{512}$) to intermediate feature vectors (e.g., $w \in \mathbb{R}^{512}$ in W space), by learning a non-linear mapping f: $z_s \to w$, such that the w's are decoded to images (e.g., $I(w) = I(f(z_s)) \in \mathbb{R}^{3 \times 1024 \times 1024}$).

In an uncontrolled setup, $z_s$ is sampled from a multi-dimensional normal distribution. To measure attributes of the image, a class-specific attribute function $\mathcal{A}$ (e.g., a classifier network) returns a vector of attributes a:= $\mathcal{A}$ (I) for any given image I belonging to the class under consideration. The attributes are represented as an l-dimensional vector (e.g., l=17 for human faces in the tests).

In a conventional StyleGAN architecture, the latent vectors are typically selected at random, whereas the feature vectors represent image attributes in a subspace of interest. According to embodiments of the present disclosure, a latent vector may be calculated based on an existing image (or an existing feature vector), and a mapping network 700 may modify the feature vectors to include a set of target attributes.

Thus, in one embodiment, a first task involves mapping latent vectors to feature vectors, which can then be used to generate images. Solving the first task amounts to sampling z from a multi-dimensional normal distribution and using a learned mapping function of the form $\Phi(z,a)$ where a denotes the target attributes, to produce suitable intermediate weights. These weights, when decoded, produce attribute-conditioned image samples of the form $\Phi(z,a))$ matching the target attribute.

For example, using a zero-mean multi-dimensional normal distribution with identity as variance, conditional samples are taken as, $$z \sim N(0,I) \text{ and } w = \Phi(z,a) \quad (1)$$

and in the process satisfy $\mathcal{A}(I(\Phi(z,a))) = a$. Further details on how to train and use a neural network to model such a function $\Phi(z,a)$ using forward inference on a conditional continuous normalizing flow (CNF) are described below. In some cases, a normalizing flow maps the samples from an n-dimensional prior distribution (in this case a normal distribution) to a latent distribution conditioned on the target attributes.

A second task involves generating a latent vector that represents an original image. Given an image $I_0$, first project the image to feature vector space to obtain $w_0$ such that $I(w_0) \approx I_0$. Then edit the current image attributes $a_0 = \mathcal{A}(I(w_0))$ to user specified attributes $a_t$, whereby the user has indicated changes to one or multiple of the original attributes, while best preserving the original image identity. Then recover latent variables $z_0$ that lead to intermediate weights $w_0$ using an inverse lookup $z_0 = \Psi(w_0, a_0)$. The inverse map is realized through using a reverse inference of the CNF network described above, i.e., $\Psi(w_0, a_0) := \Phi^{-1}(w_0, a_0)$. Perform a forward inference, using the same CNF, to get the edited image $I_t$ that preserves the identity of the source image as, $$I_t = \Phi(z_0, a_t) = \Phi(\Phi^{-1}(w_0, a_0), a_t) = \Phi(\Phi^{-1}(w_0, \mathcal{A}(I(w_0))), a_t) \quad (2)$$

A summary of normalizing flows and details on how the invertible CNF is used to compute the likelihood of the samples from the latent distribution of a generative model will be explained below with reference to FIG. 8.

Training the Neural Network

According to an embodiment of the present disclosure, a dataset is prepared as follows. First, sample 10k samples from the Gaussian Z space of the StyleGAN1 of StyleGAN2. Then infer the corresponding w codes in the disentangled W space of the models. In one example, vectors w of W space truncated by a factor of 0.7 are used for training the final model. Corresponding images I(w) are generated via StyleGAN1 or StyleGAN2 generator and hence a mapping between the W space and the image space I is created. To have conditional control over the image features, a face classifier network $\mathcal{A}$ is used to map the images I to the attribute $A_t$ domain. The dataset is used for the final training of the flow network using triplets $w \in W$, $i \in I$ and $a_t \in A_t$.

To prepare the $A_t$ domain of the training dataset, an attribute classifier (e.g., Microsoft Face API) is used. The attribute classifier provides a diverse set of attributes given a face image. In an embodiment of the present disclosure, the main attributes include gender, pitch, yaw, eyeglasses, age, facial hair, expression, and baldness. For the lighting attribute, predictions from the DPR model are used to output a 9-dimensional vector per image measuring the first 9 spherical harmonics of the lighting. Thus, for faces, the attribute values are given by $a_t \in \mathbb{R}^{17}$.

In some cases, an objective during the training is to maximize the likelihood of the data w given a set of attributes $a_t$. The objective is written as $\max_w p(w|a_t)$. Here, the network assumes the standard Gaussian prior with z as the variable. Also, let $\mathcal{N}$ represent the Gaussian probability density function. Algorithm 1 shows the training algorithm of the described joint conditional continuous normalizing flows:

---

ALGORITHM 1: Flow training Algorithm

---

Input: Paired latent-attribute data ({w, $a_t$}); Neural network $\phi$;
  Integration times $t_0$ and $t_1$; ODE solver with adjoint
  sensitivity method; Number of training steps $N_t$; Optimizer
  F'; Learning rate $\eta$.
Initialization:

$$\begin{bmatrix} z(t_1) \\ \log p(w|a_t) - \log p(z(t_1)) \end{bmatrix} = \begin{bmatrix} w \\ 0 \end{bmatrix}; a_t^+ = B(t) \| a_t,$$

where B expands the variable t such that spatial dimension of $a_t$ is
  equal to t and $\|$ is the concatenation operation.
for i = [1 : $N_t$] do $$\begin{bmatrix} z_0 \\ \Delta_{\log p} \end{bmatrix} = \int_{t_1}^{t_0} \begin{bmatrix} \phi(z(t), a_t^+; \theta) \\ -Tr\left(\frac{\partial \phi}{\partial z(t)}\right) \end{bmatrix} dt$$

$\mathcal{L} = \log \mathcal{N}(z_0; 0, I) - \Delta_{\log p}$
$\theta \leftarrow \theta - \eta F' (\nabla_\theta \mathcal{L}, \theta);$
end

---

In one example, an Adam optimizer is used with an initial learning rate of $1 \times 10^{-3}$, while other parameters ($\beta 1$, $\beta 2$) of the Adam optimizer are set to default values.

In some cases, this training formulation of the framework is used for sampling. In particular, the mapping learnt between the two domains are used to produce a vector z given a w vector and vice versa. Moreover, the vectors are manipulated in the respective domains and the changes translate to the other domain semantically from the editing perspective.

Once the network is trained, the network can conditionally sample the $w \in W$ with the Gaussian prior modelled by the continuous normalizing flows. In one example, the attribute variable $a_t$ is set to a desired set of values, and then sample multiple $z \sim p(z)$. These vectors are passed through the (trained) conditional CNF network. The learned vector field translates the vectors to produce the latent vectors w, which are then fed to the StyleGAN1 or StyleGAN2 generator. The results of sampling given a set of attributes will be demonstrated below. Applying the described network and methods, the quality of the samples is high as well as unedited attributes remain largely fixed. The conditional sampling results validate that the network learned the underlying semantic representations, which is further used to perform semantic edits to the images.

Figure 8:
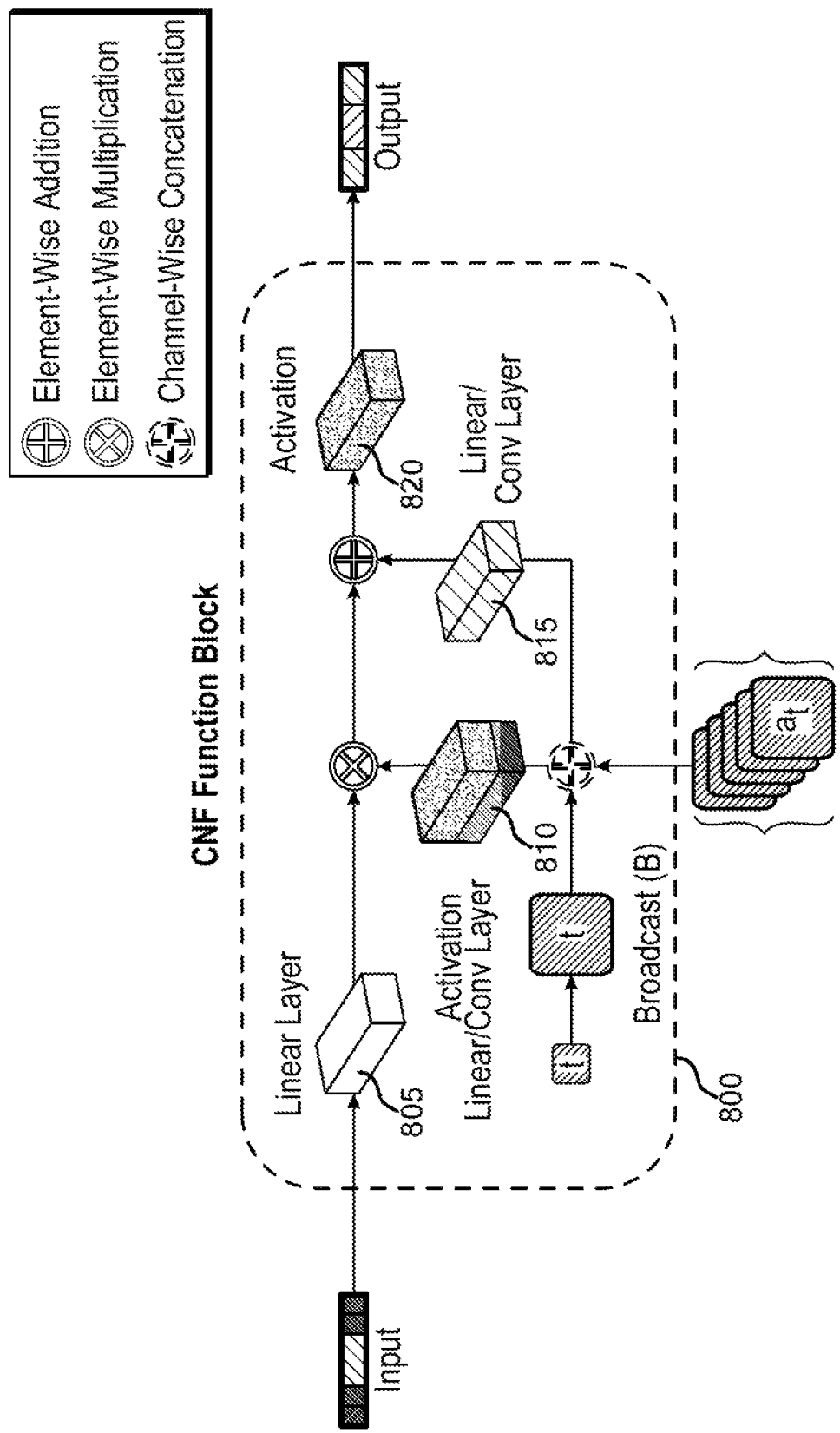
FIG. 8 shows an example of a continuous normalizing flow (CNF) blocks according to aspects of the present disclosure.

FIG. 8 shows an example of a continuous normalizing flow (CNF) block 800 according to aspects of the present disclosure. CNF block 800 includes linear layer 805, activation linear-convolution layer 810, linear-convolution layer 815, and activation layer 820. One or more CNF blocks 800 are used to compute a non-linear change in a target attribute in a way that depends on an original image (i.e., the change between a feature vector having original attributes and a modified feature vector having changed target attributes depends on attributes of the original image that are not changed).

A normalizing flow, often realized as a sequence of invertible transformations, maps an unknown distribution to a known distribution (e.g., normal or uniform distribution). An inverse mapping, from an initial density to a final density and vice versa, are expressed as a chain of recursive change of variables.

Let $\phi: \mathbb{R}^d \to \mathbb{R}^d$ be a bijective map such that there exists an invertible map g with $g := \phi^{-1}$. Let the transformation of the random variable be from $z \cdot p_z(z)$ to w such that $w = \phi(z)$. By the change of variable rule, the output probability density of variable w can be obtained as, $$p_w(w) = p_z(z) \left| \det \frac{\partial \phi}{\partial z} \right|^{-1} \tag{3}$$

where $\phi^{-1}(w) = z$ or $g(w) = z$.

The same rule applies for a successive transformation of the variable z. For example, the transformation is represented by $w = \phi_K (\phi_{K-1}(\ldots \phi_1(z_0)))$, i.e., $z_0 \to z_{K-1} \to z_K = w$ and since $\phi^{-1}$ exists the inverse mapping is expressed as $z_0 = \phi_1^{-1}(\phi_2^{-1}(\ldots \phi_K^{-1}(w)))$. Therefore, applying the change of variable rule provides the modified output log probability density, $$\log p_w(w) = \log p_z(z_0) - \sum_{n=1}^{K} \log \det \frac{\partial \phi_n}{\partial z_n} \tag{4}$$

where $z_{n+1} = \phi_n(z_n)$ and $z_K = w$.

In the special case of planar flows, the function $\phi$ can be modeled by a neural network where the flow takes the form, $$z_{n+1} = z_n + u_n h(w_n^T z_n + b) \tag{5}$$

where $u_n \in \mathcal{A}^d$, $w_n \in \mathcal{A}^d$, $b \in \mathcal{A}$ are the learnable parameters, h( ) is a smooth element-wise non-linear activation with derivative h'( ). The probability density obtained by sampling $p_z(z_0)$ and applying a sequence of planar transforms to produce variable $w = z_K$ takes the form, $$\log p_w(w) = \log p_z(z_0) - \sum_{n=1}^{K} \log |1 + u_n^T \xi(z_n - 1)| \tag{6}$$

where $\xi(z) = h'(w^T z + b) w$.

The normalizing flows are generalized into a continuous formulation using neural ODE which adopts adjoint sensitivity method to compute the gradients with respect to the parameters in an ODE black box solver. In continuous normalizing flows, differential equations are expressed in the form:

$$\frac{dz}{dt} \phi(z(t), t; \theta)$$

where z is the variable of a given distribution, t is the time variable, and θ are the parameters of an arbitrary neural network. Specifically, the differential equation takes the form, $z(t_1)=z(t_0)+\int_{t_0}^{t_1}\phi(z(t),t;\theta)dt$. Finally, the change in the log density can be expressed as, $$\log p(z(t_1)) = \log p(z(t_0)) - \int_{t_0}^{t_1} Tr\left(\frac{\partial \phi}{\partial z(t)}\right)dt \qquad (7)$$

For both the conditional sampling and editing tasks, the embodiments of the present disclosure condition based on the target attributes and continuously evolve the image samples.

A series of the gate-bias modulation networks are used to model the function φ of the conditional continuous normalizing flows. To include the condition information into the network, the time variable t is transformed with a broadcast operation B to match the spatial dimensions of the attribute space. Then, apply channel-wise concatenation to the resultant variable with the attribute variable $a_t$, and finally the new variable $a_t^+$ is fed to the network as a time dependent conditional attribute variable. At inference time, linear interpolation is used in the attribute domain to smoothly translate between the two edits to get the final image.

Depending on the properties of the extended $a_t^+$ tensor, the convolutional or linear neural network is used to transform the tensors with the same shape as the input. Then, gate-bias modulation are performed on the input tensor. Note sigmoid non-linearity is used before the gate tensor operation. The final output tensor is passed through a Tanh non-linearity before passing to the next stage of the normalizing flow. Moving batch normalization is used for stable training of the network.

According to an exemplary embodiment of the present disclosure, flow networks trained on one attribute at a time learns entangled vector fields, and hence resultant edits can produce unwanted changes along other attributes. Instead, the described network and methods use joint attribute learning for training the flow network. All the attributes are concatenated to a single tensor before feeding it to the network. The joint attribute training can increase the editing quality with a more disentangled representation. In some cases, training on a single condition over-fits the model on the training data. Further, in absence of measures along other attribute axis, the conditional CNF remains oblivious of variations along those other attribute directions. Therefore, the flow changes multiple features at a time. Joint attribute training can learn stable conditional vector fields for each attribute.

Thus, embodiments of the present provide an effective solution to attribute-conditioned sampling and attribute-controlled editing by formulating conditional exploration as an instance of conditional continuous normalizing flows in a latent space conditioned by attribute features. Certain embodiments of the present disclosure solve the attribute-based editing problem using a model based on a conditional exploration problem in an unsupervised GAN, rather than using conditional generation that depends on attribute-based retraining.

Joint Reverse Encoding

Figure 9:
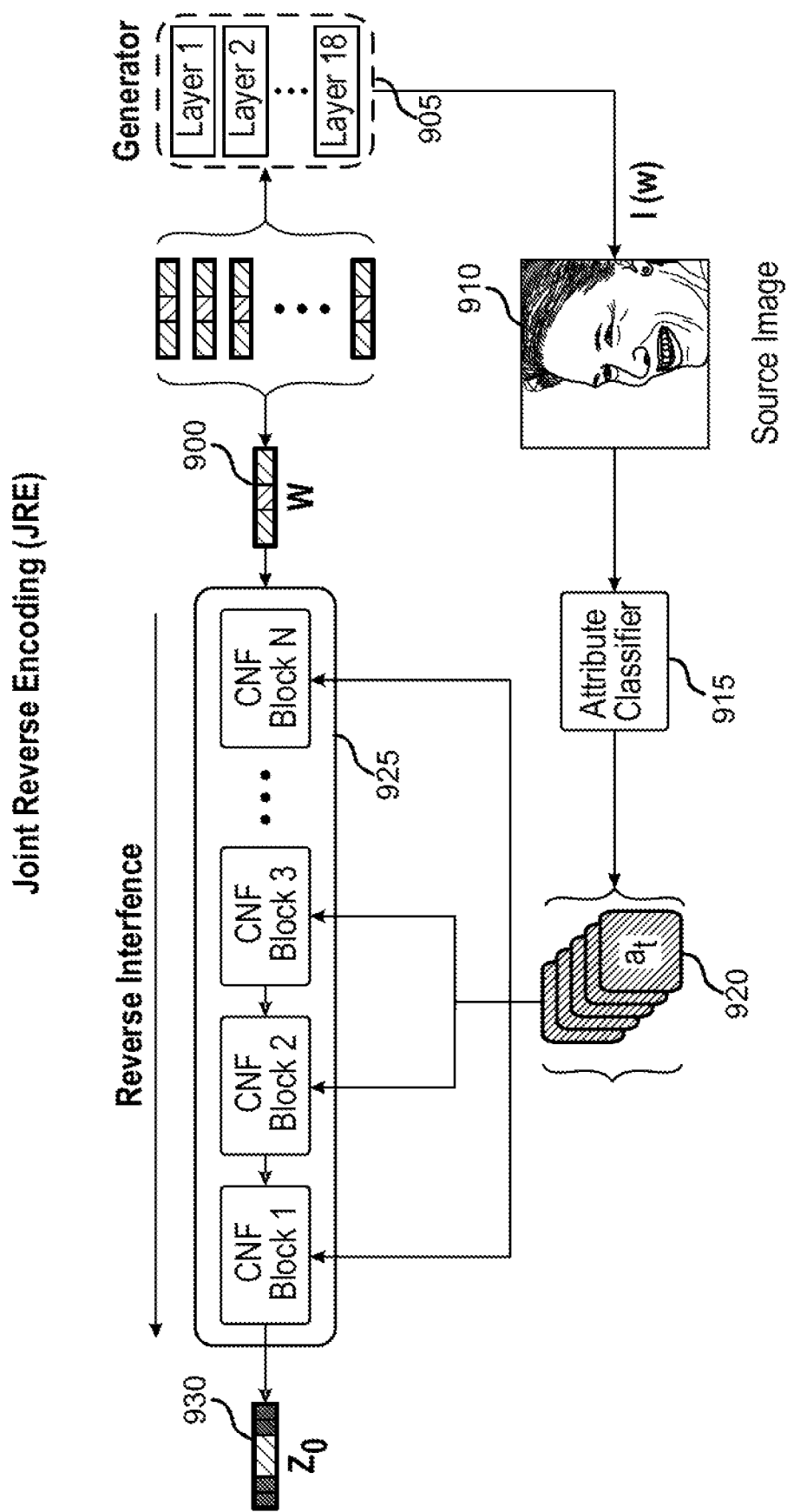
FIG. 9 shows an example of joint reverse encoding according to aspects of the present disclosure.

FIG. 9 shows an example of joint reverse encoding according to aspects of the present disclosure. Joint reverse encoding refers to the process of identifying a latent vector for an input image based on the image and the image attributes. The joint reverse encoding uses an inverse mapping function of the mapping network. The example shown includes feature vector 900, generator network 905, original image 910, attribute classifier 915, attributes 920, mapping network 925, and latent vector 930.

The process begins either with the feature vector 900 or the original image 910, either of which is used to create the other using the generator network 905 (or its inverse). Then the original image 910 is provided to an attribute classifier 915 to generate attributes 920. The attributes 920 and the feature vector 900 are both fed to the mapping network 925 to find the latent vector 930. In general, there is a complex relationship between the attributes 920 and values of the feature vector 900 and the latent vector 930.

Thus, according to an embodiment of the present disclosure, semantic editing operation according to neural networks described herein includes the Joint Reverse Encoding process. Joint reverse encoding operation jointly encodes the variables w and $a_t$. For example, given a w∈W, the source image i∈I is inferred. In some cases, the joint reverse encoding operation starts with a real image and use the projection methods to infer the corresponding w. In some cases, such procedures render the vectors outside the original p(w) distribution. In some cases, the image I is passed through the face classifier API and the lighting prediction DPR network to infer the attributes. Then, reverse inference is used given a set w and $a_t$ to infer the corresponding $z_0$.

Generator network 905 is an example of, or includes aspects of, the corresponding element or elements described with reference to FIGS. 7 and 11. Original image 910 is an example of, or includes aspects of, the corresponding element or elements described with reference to FIGS. 1, 2, and 4.

Attribute classifier 915 identifies a set of original attribute values corresponding to the original attributes 920 based on the original image 910, and a set of original attribute values corresponding to original attributes 920. Mapping network 925 is an example of, or includes aspects of, the corresponding element or elements described with reference to FIGS. 7 and 11. Latent vector 930 is an example of, or includes aspects of, the corresponding element or elements described with reference to FIG. 11.

Figure 10:
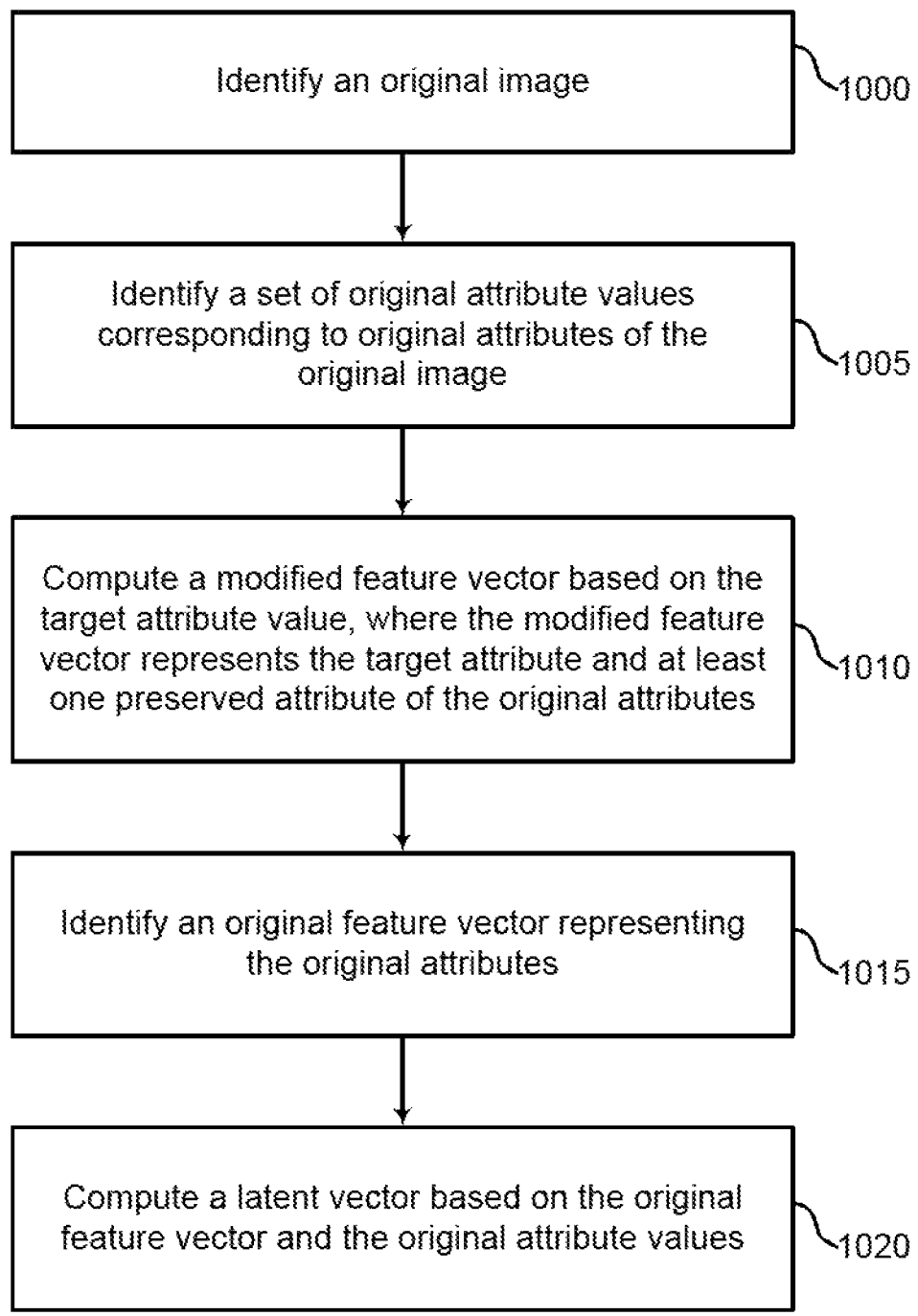
FIG. 10 shows an example of a process for joint reverse encoding according to aspects of the present disclosure.

FIG. 10 shows an example of a process for joint reverse encoding according to aspects of the present disclosure. In some examples, these operations are performed by a system including a processor executing a set of codes to control functional elements of an apparatus. Additionally or alternatively, the processes are performed using special-purpose hardware. Generally, these operations are performed according to the methods and processes described in accordance with aspects of the present disclosure. For example, the operations are composed of various substeps, or are performed in conjunction with other operations described herein.

At operation 1000, the system identifies an original image. In some cases, the operations of this step refer to, or are performed by, an input component as described with reference to FIG. 3.

At operation 1005, the system identifies a set of original attribute values corresponding to original attributes of the original image. In some cases, the operations of this step refer to, or are performed by, an attribute classifier as described with reference to FIG. 9.

At operation 1010, the system computes a modified feature vector based on the target attribute value, where the modified feature vector represents the target attribute and at least one preserved attribute of the original attributes. In some cases, the operations of this step refer to, or are performed by, a mapping network as described with reference to FIGS. 7, 9, and 11.

At operation 1015, the system identifies an original feature vector representing the original attributes. In some cases, the operations of this step refer to, or are performed by, an input component as described with reference to FIG. 3.

At operation 1020, the system computes a latent vector based on the original feature vector and the original attribute values. In some cases, the operations of this step refer to, or are performed by, a as described with reference to FIG. 5.

According to an embodiment of the present disclosure, the latent vectors w E $R^{512}$ is sampled from the W space (e.g., of the StyleGAN1 or StyleGAN2). The prior distribution is represented by $p_z(z)$, where $z \in R^{512}$. The goal is to model a conditional mapping between the two domains. Moreover, it is imperative to be able to learn a semantic mapping between the domains so that editing applications are realizable.

Conditional Forward Editing

Figure 11:
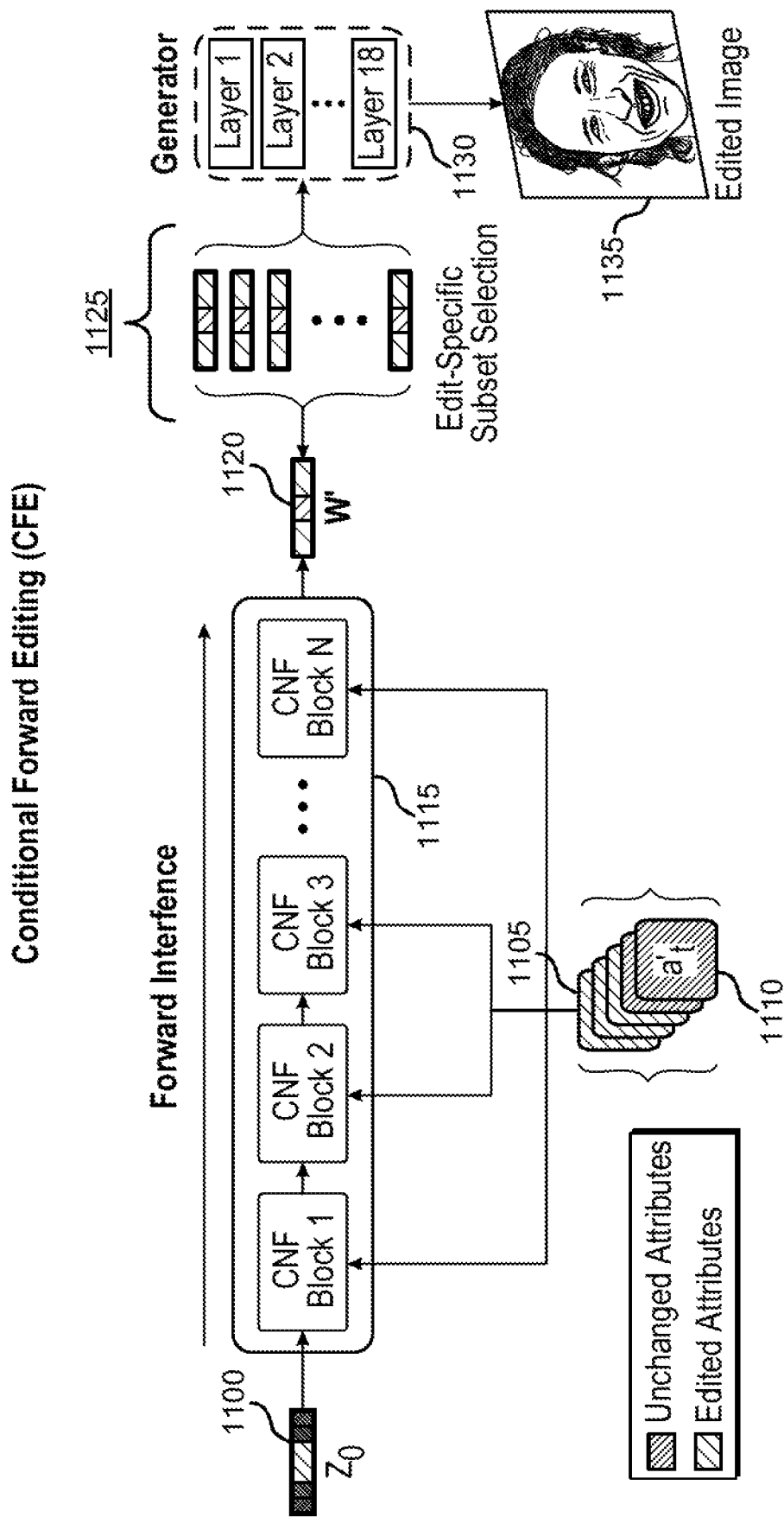
FIG. 11 shows an example of conditional forward editing according to aspects of the present disclosure.

FIG. 11 shows an example of conditional forward editing according to aspects of the present disclosure. After a latent vector is identified (as described in FIGS. 9 and 10), conditional forward editing generates a modified feature vector, and then a modified image based on the modified feature vector). The example shown includes latent vector 1100, target attributes 1105, preserved attributes 1110, mapping network 1115, modified feature vector 1120, layer selection 1125, generator network 1130, and modified image 1135.

The target attributes 1105 refer to attributes that a user wants to change in an image, and the preserved attributes 1110 refers to attributes that the user wants to preserve in the original image. Values representing the target attributes 1105 are fed to the mapping network 1115 along with the latent vector 1100.

According to example embodiments of the present disclosure, the mapping network 1115 generates a modified feature vector 1120 based on. In some cases, the mapping network 1115 first creates an original feature vector (not shown) representing the original image, and then maps the original feature vector to the modified feature vector 1120 in a non-linear fashion based on both the target attributes 1105 and the preserved attributes 1110 (i.e., the change from the original feature vector to the modified feature vector 1120 depends on the attributes of the original image).

The generator network 1130 then creates the modified image 1135 based on the modified feature vector 1120. The modified image 1135 includes the desired target attributes, but also preserves the preserved attributes 1110 (e.g., which represent the identity of a person in the image).

Thus, the conditional forward editing (CFE) operation fixes the $z_0$ and translates the semantic manipulation to the image I, the set of desired conditions are changed (e.g., change the age attribute from 20 to 60 years old). Then, with the given vector $z_0$ and the new set of (target) attributes $a_t$, a forward inference is conducted using the flow model. The resulting vector w' is then processed to produce a modified image.

In some cases, vector manipulations are adaptive and are obtained by solving a vector field by an ODE solver. The semantic edits performed on the feature vectors w forces the resultant vector to remain in the distribution of W space (p(w)). Accordingly, the described network performs stable sequential edits.

In some cases, the editing framework includes an edit-specific subset selection. That is, the given vector W is applied at the different indices of the W+ (e.g. $R^{18*512}$) space depending on the nature of the edit. For example, a lighting change is made in the later layers of the network where mostly the color/style information is present. In an example embodiment, the following indices of the edits are used: Light (7-11), Expression (4-5), Yaw (0-4), Pitch (0-4), Age (0-7), Gender (0-7), Remove Glasses (0-2), Add Glasses (0-5), Baldness (0-5) and Facial hair (5-7). The editing framework further includes inference of the image from the modified feature vectors.

According to an embodiment of the present disclosure, for a stable sequential edit, the procedures of the described semantic edit are repeated for each changed attribute. The vectors of resultant W+ space are re-mapped to a new set of $z_0$s using JRE followed by CFE and edit specific subset selection to perform a subsequent edit.

Latent vector 1100 is an example of, or includes aspects of, the corresponding element or elements described with reference to FIG. 9. Mapping network 1115 and generator network 1130 are examples of, or include aspects of, the corresponding elements described with reference to FIGS. 7 and 9. Modified image 1135 is an example of, or includes aspects of, the corresponding element or elements described with reference to FIG. 4.

Figure 12:
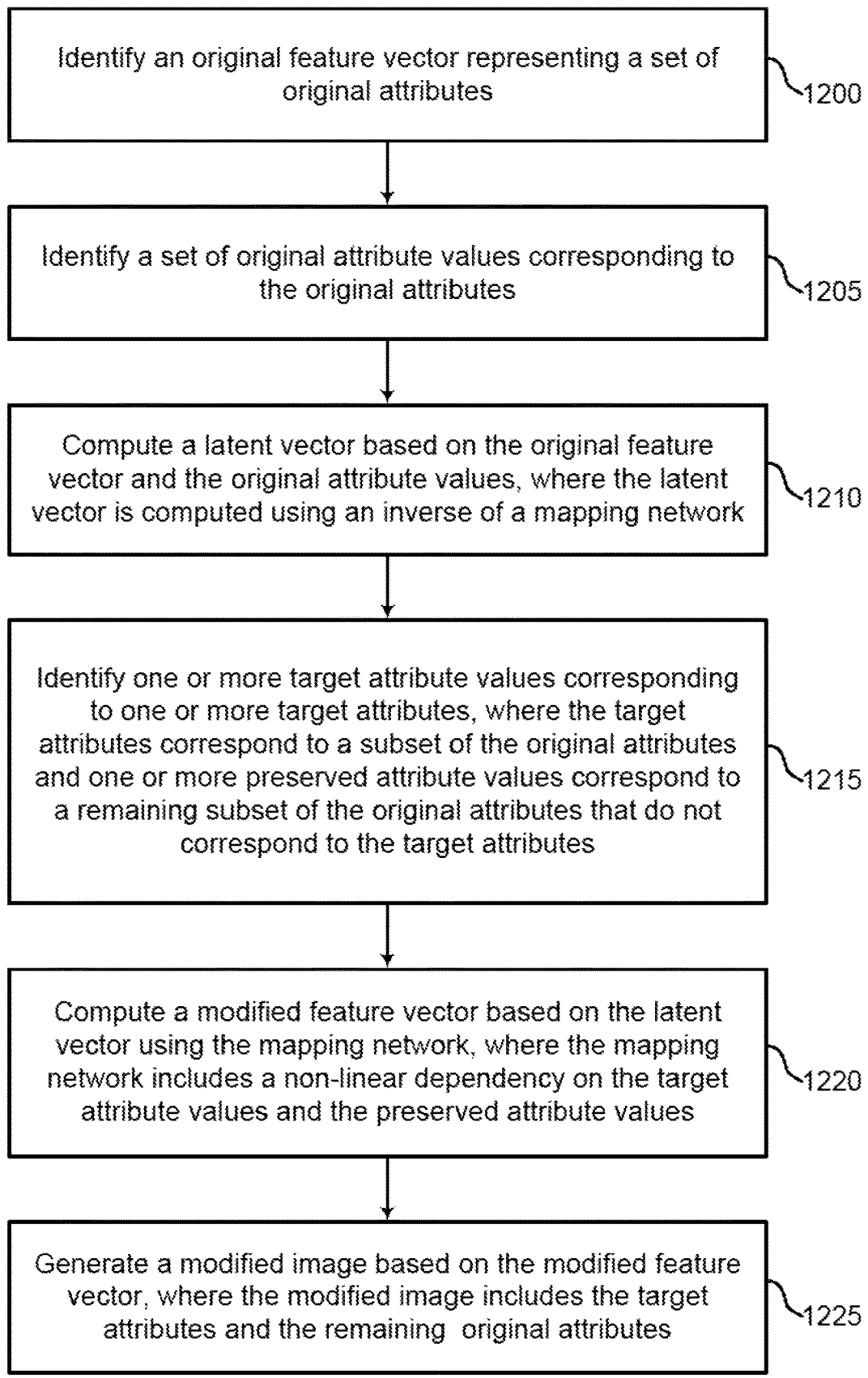
FIG. 12 shows an example of a method of conditional forward editing according to aspects of the present disclosure.

FIG. 12 shows an example of a method of conditional forward editing according to aspects of the present disclosure. In some examples, these operations are performed by a system including a processor executing a set of codes to control functional elements of an apparatus. Additionally or alternatively, the processes are performed using special-purpose hardware. Generally, these operations are performed according to the methods and processes described in accordance with aspects of the present disclosure. For example, the operations are composed of various substeps, or are performed in conjunction with other operations described herein.

At operation 1200, the system identifies an original feature vector representing a set of original attributes. In some cases, the operations of this step refer to, or are performed by, an input component as described with reference to FIG. 3.

At operation 1205, the system identifies a set of original attribute values corresponding to the original attributes. In some cases, the operations of this step refer to, or are performed by, an attribute classifier as described with reference to FIG. 9.

At operation 1210, the system computes a latent vector based on the original feature vector and the original attribute values, where the latent vector is computed using an inverse of a mapping network. In some cases, the operations of this step refer to, or are performed by, a mapping network as described with reference to FIGS. 7, 9, and 11.

At operation 1215, the system identifies one or more target attribute values corresponding to one or more target attributes, where the target attributes correspond to a subset of the original attributes and one or more preserved attribute values correspond to a remaining subset of the original attributes that do not correspond to the target attributes. In some cases, the operations of this step refer to, or are performed by, an input component as described with reference to FIG. 3.

At operation 1220, the system computes a modified feature vector based on the latent vector using the mapping network, where the mapping network includes a non-linear dependency on the target attribute values and the preserved attribute values. In some cases, the operations of this step refer to, or are performed by, a mapping network as described with reference to FIGS. 7, 9, and 11.

At operation 1225, the system generates a modified image based on the modified feature vector, where the modified image includes the target attributes and the remaining subset of the original attributes. In some cases, the operations of this step refer to, or are performed by, a generator network as described with reference to FIGS. 7, 9, and 11.

Evaluation

An embodiment of the present disclosure has been evaluated in comparison to networks based on Image2StyleGAN, InterfaceGAN, GANSpace and StyleRig. Two datasets have been used for evaluation: the Flickr-Faces-HQ (FFHQ) and LSUN-Car. FFHQ is a high-quality image dataset of human faces (e.g., 1024×1024 resolution) with 70,000 images. The FFHQ dataset is diverse in terms of ethnicity, age, and accessories. In another example, LSUN-Car is a 512×384 resolution car dataset. The dataset is diverse in terms of car pose, color, and types. According to the example embodiment, a StyleGAN model is pretrained on these datasets to for evaluation.

First, joint attribute encoding and edit specific subset selection are implemented and evaluated independently. Joint attribute encoding are performed to ensure the face identity is preserved during the conditional forward editing. Results show that in case of the joint encoding of the attributes, the identity of the face (e.g., the unedited attributes like hair style, age, background) can be preserved.

The effectiveness of the edit specific subset selection block has also been demonstrated. Edits done with an edit specific subset selection block include high quality edits producing images with comparable the skin tone, background, and clothes with respect to the source image.

Results of the conditional sampling show generated samples of high quality. In one example, females of different age groups with glasses and fixed pose are sampled (e.g., the first row). During the sampling operation, the network resample z to infer vectors in w and keep a set of attributes fixed. In addition to the quality of the samples, the diversity of the samples is also high.

According to the embodiment user for evaluation, multiple edits that can be performed in sequence. For example, consider the sequential edits of Pose→Lighting→Expression→Gender→Age. The network can perform extreme pose changes and can smoothly transfer the edits as the attributes change. Global features such as background, cloths, and skin tone are substantially preserved. The edits of pose change, expression, and lighting preserve the identity of the person.

In other examples, multiple edits of gender, facial hair, pose, lighting, age, expression, eyeglasses, and baldness are performed simultaneously. The quality of simultaneous edits is also high. The order of the edits does not affect the quality of the images. Directly manipulating the latent space (e.g., adding offset vectors) does not achieve the same high quality because vector manipulations often move the feature vectors into a region outside the usual distribution. This leads to visible artifacts in the generated images and the face identity is affected.

Image2StyleGAN, InterfaceGAN, and the example embodiment used for evaluation have been subjected to extreme attribute conditions and perform sequential edits on the images. Three primary edits are considered such as pose, expression, and lighting. Comparing to other frameworks, the example embodiment processes the sequential edits to produce high quality output and while preserving face identity (e.g., facial features).

Compared to conventional methods based on GANSpace and StyleRig, the example embodiment provides greatly improved visual quality. Failure cases in conventional networks are attributed to the fact that conventional edits are still linear in nature. For example, an unsupervised GANSpace network does not control which attributes or combination of attributes are discovered as PCA axes. By contrast, embodiments of the present disclosure directly learn non-linear mapping between a latent space and targeted attribute variations.

According to an embodiment, attributes are transferred from the source image to target image. The network supports a diverse set of attributes. Conventional networks, such as a conventional network based on the StyleRig framework, cannot process eyeglasses, facial hair, age, and gender, which are not modeled in morphable face models. Embodiments of the present disclosure perform well despite a highly entangled latent space. In some cases, a projection algorithm produces feature vectors that are different from the original distribution.

Alternative methods are based on that edits can be encoded by vector addition and subtraction in latent space. These methods are referred to as linear models. By contrast, embodiments of the present disclosure include non-linear models. Thus, it is possible to analyze how much the edits depend on the initial latent vector. For an edit w'→w, the difference vector is computed between the final latent vector w' and the initial latent vector w. In some examples, linear models assume that the difference vectors are independent of the starting latent vector w if the same edit is applied. Given many edits of the same type, the difference in the vectors w'-w is computed. Then, given a set of pairs of these vectors, the magnitude and the angles between the vectors is compared.

In one example, the magnitudes (i.e., norm) differ by a factor of 12.5 on average. The angles between the vectors are observed to vary up to 36°. This shows that the edits depend on the initial vector w, allowing the resultant vector to follow the original posterior distribution. Unlike linear models, which apply the same vector for a change regardless of the original image, an example embodiment of the present disclosure adaptively adjusts the manipulation of feature vectors to produce high quality edits.

To assess the non-linearity of the edit path, the interpolation in the attribute domain ($a_t$) is compared to the interpolation in the latent domain (w). A comparison is made between linearly changing the variable of the attribute that is fed to an example embodiment of the present disclosure versus linear interpolation of the vector w to w'. A number of points (e.g., 20 points) are sampled along the interpolation paths of both scenarios and the feature vectors produced by different methods are compared. A norm of the mean of these difference vectors are computed along the path. On average, the linear interpolation in the w domain differs from the attribute domain $a_t$ by a factor of 1.5, validating the non-linearity of the path taken.

Results of an example embodiment of the present disclosure are quantitatively evaluated against Image2StyleGAN and InterfaceGAN using a number of different metrics (e.g., FID, face identity, and the edit consistency scores).

To measure the diversity and quality of the output samples, the FID score is used between the test images and the edited images generated from these images. The results are evaluated with 1k generated samples from the Style-GAN2 framework. These samples are used to perform sequential edits. The FID score for the example embodiment is relatively low compared to other methods (lower the better).

To evaluate the quality of the edit and quantify the identity preserving property of the edits, the edited images are evaluated based on the face identity score. Consider three metrics to determine if the face identity is preserved. Take a face classifier model for face recognition to evaluate the metrics. The classifier outputs the embeddings of the images which can be compared. Given two images (before and after the edits) i.e., i1 and i2, the Euclidean distance and the cosine similarity between the embeddings are calculated. In some cases, a classifier different from the attribute estimator is used in training the example embodiment.

Three major edits include light, pose, and expression. The metrics show that the example embodiment of the present disclosure outperforms other methods across all the metrics and the edits. In addition, the scores are valuated when all the edits are applied sequentially. The example embodiment shows superiority in quantitative evaluation. Moreover, the accuracy is computed based on the final decision of the classifier of the two embeddings being the same face.

An edit consistency score is introduced to measure the consistency of the applied edit across the images. For example, in a sequential editing setup, if the pose edit is applied, it should not be affected by where in the sequence it is applied. In principle, different permutations of edits should lead to the same attributes when classified with an attribute classifier. The cyclic edit consistency evaluation of the example embodiment is shown. ep-pl is referred to the application of the expression and then the pose in the sequence, and comparing it with the pose and lighting edit—the pose attribute is expected to be the same when evaluated on the final image. It is evaluated using the score $\mathcal{A}_p(E_P(E_e(I))) - \mathcal{A}_p(E_l(E_p(I)))$, where $E_x$ denotes conditional edit along attribute specification x and $\mathcal{A}_p$ denotes pose attribute vector regressed by the attribute classifier. The example embodiment remains consistent under different permutations. In some cases, mean (absolute) error is used across the respective attributes.

Thus, according to various embodiments of the present disclosure, a neural network is presented that includes a simple yet robust solution to the conditional exploration of a latent space. The network is configured to perform attribute-conditioned sampling and attribute-controlled editing using conditional continuous normalizing flows. As a result, the network samples high quality images from the latent space given a set of attributes. Fine-grained disentangled edits along various attributes (e.g., camera pose, illumination variation, expression, skin tone, gender, and age for faces) are performed Accordingly, the present disclosure includes at least the following embodiments.

A method for image processing is described. Embodiments of the method includes identifying an original image including a plurality of original attributes, wherein the original attributes comprise semantic features of the original image, identifying a target attribute value for modifying the original image, wherein the target attribute value represents a target attribute different from a corresponding original attribute of the original image, computing a modified feature vector based on the target attribute value, wherein the modified feature vector represents the target attribute and at least one preserved attribute of the original attributes, and generating a modified image based on the modified feature vector, wherein the modified image includes the target attribute and the at least one preserved attribute.

An apparatus for image processing is described. The apparatus includes a processor, memory in electronic communication with the processor, and instructions stored in the memory. The instructions are operable to cause the processor to identify an original image including a plurality of original attributes, wherein the original attributes comprise semantic features of the original image, identify a target attribute value for modifying the original image, wherein the target attribute value represents a target attribute different from a corresponding original attribute of the original image, compute a modified feature vector based on the target attribute value, wherein the modified feature vector represents the target attribute and at least one preserved attribute of the original attributes, and generate a modified image based on the modified feature vector, wherein the modified image includes the target attribute and the at least one preserved attribute.

A non-transitory computer readable medium storing code for image processing is described. In some examples, the code comprises instructions executable by a processor to: identify an original image including a plurality of original attributes, wherein the original attributes comprise semantic features of the original image, identify a target attribute value for modifying the original image, wherein the target attribute value represents a target attribute different from a corresponding original attribute of the original image, compute a modified feature vector based on the target attribute value, wherein the modified feature vector represents the target attribute and at least one preserved attribute of the original attributes, and generate a modified image based on the modified feature vector, wherein the modified image includes the target attribute and the at least one preserved attribute.

Some examples of the method, apparatus, and non-transitory computer readable medium described above further include identifying an original feature vector representing the original attributes. In some examples, the original image is generated based on the original feature vector. In some examples, the original feature vector is generated based on the original image.

Some examples of the method, apparatus, and non-transitory computer readable medium described above further include identifying a plurality of original attribute values corresponding to the original attributes based on the original image. Some examples further include computing a latent vector based on the original feature vector and the original attribute values. In some examples, the original attributes are identified using an attribute classifier.

In some examples, the latent vector is computed using an inverse of a mapping network comprising one or more continuous normalizing flow (CNF) blocks. In some examples, the modified feature vector is computed based on the latent vector using a mapping network comprising one or more CNF blocks.

In some examples, the mapping network is trained jointly on a plurality of attributes. In some examples, the original image comprises an image of a face, and the original attributes include a facial expression, an orientation, an age, a lighting property, a gender, a hairstyle, or any combination thereof.

Some examples of the method, apparatus, and non-transitory computer readable medium described above further include receiving input from a user indicating the target attribute value, wherein the input is received using an image editing application during editing of the original image.

Some examples further include displaying the modified image to the user via the image editing application in response to the input.

A method for image processing is described. Embodiments of the method include identifying an original feature vector representing a plurality of original attributes, identifying a plurality of original attribute values corresponding to the original attributes, computing a latent vector based on the original feature vector and the original attribute values, wherein the latent vector is computed using an inverse of a mapping network, identifying one or more target attribute values corresponding to one or more target attributes, wherein the target attributes correspond to a subset of the original attributes and one or more preserved attribute values correspond to a remaining subset of the original attributes that do not correspond to the target attributes, computing a modified feature vector based on the latent vector using the mapping network, wherein the mapping network comprises a non-linear dependency on the target attribute values and the preserved attribute values, and generating a modified image based on the modified feature vector, wherein the modified image includes the target attributes and the remaining subset of the original attributes.

An apparatus for image processing is described. The apparatus includes a processor, memory in electronic communication with the processor, and instructions stored in the memory. The instructions are operable to cause the processor to identify an original feature vector representing a plurality of original attributes, identify a plurality of original attribute values corresponding to the original attributes, compute a latent vector based on the original feature vector and the original attribute values, wherein the latent vector is computed using an inverse of a mapping network, identify one or more target attribute values corresponding to one or more target attributes, wherein the target attributes correspond to a subset of the original attributes and one or more preserved attribute values correspond to a remaining subset of the original attributes that do not correspond to the target attributes, compute a modified feature vector based on the latent vector using the mapping network, wherein the mapping network comprises a non-linear dependency on the target attribute values and the preserved attribute values, and generate a modified image based on the modified feature vector, wherein the modified image includes the target attributes and the remaining subset of the original attributes.

A non-transitory computer readable medium storing code for image processing is described. In some examples, the code comprises instructions executable by a processor to: identify an original feature vector representing a plurality of original attributes, identify a plurality of original attribute values corresponding to the original attributes, compute a latent vector based on the original feature vector and the original attribute values, wherein the latent vector is computed using an inverse of a mapping network, identify one or more target attribute values corresponding to one or more target attributes, wherein the target attributes correspond to a subset of the original attributes and one or more preserved attribute values correspond to a remaining subset of the original attributes that do not correspond to the target attributes, compute a modified feature vector based on the latent vector using the mapping network, wherein the mapping network comprises a non-linear dependency on the target attribute values and the preserved attribute values, and generate a modified image based on the modified feature vector, wherein the modified image includes the target attributes and the remaining subset of the original attributes.

In some examples, the mapping network is trained jointly based on a plurality of attributes, and wherein the original attributes correspond to the attributes used to train the mapping network. In some examples, the mapping network is configured to enable changing the target attributes while preserving the remaining subset of the original attributes by correcting for interconnection among the original attributes in the latent vector based on the non-linear dependency.

An apparatus for image processing is described. Embodiments of the apparatus include a mapping network configured to produce a feature vector based on a latent vector and a plurality of attribute values, wherein the mapping network comprises a non-linear function dependency on the attribute values and a generator network configured to generate an image based on the feature vector, wherein the image includes attributes corresponding to the attribute values.

A method of manufacturing an apparatus for image processing is described. The method include providing a mapping network configured to produce a feature vector based on a latent vector and a plurality of attribute values, wherein the mapping network comprises a non-linear function dependency on the attribute values and providing a generator network configured to generate an image based on the feature vector, wherein the image includes attributes corresponding to the attribute values.

In some examples, the mapping network and the generator network are components of a generative adversarial network (GAN). In some examples, the mapping network and the generator network are components of a variational autoencoder (VAE). In some examples, the mapping network comprises one or more CNF blocks.

Some examples of the apparatus and method described above further include an attribute classifier configured to identify the plurality of attribute values based on an input image. In some examples, the mapping network implements an invertible function from a latent vector space to a feature vector space.

The description and drawings described herein represent example configurations and do not represent all the implementations within the scope of the claims. For example, the operations and steps are rearranged, combined, or otherwise modified. Also, structures and devices are represented in the form of block diagrams to represent the relationship between components and avoid obscuring the described concepts. Similar components or features may have the same name but may have different reference numbers corresponding to different figures.

Some modifications to the disclosure are readily apparent to those skilled in the art, and the principles defined herein are applied to other variations without departing from the scope of the disclosure. Thus, the disclosure is not limited to the examples and designs described herein, but is to be accorded the broadest scope consistent with the principles and novel features disclosed herein.

The described methods are implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. In various examples, a general-purpose processor includes a microprocessor, a conventional processor, controller, microcontroller, or state machine. In some examples, a processor is implemented as a combination of computing devices (e.g., a combination of a DSP and a microprocessor, multiple microprocessors, one or more microprocessors in conjunction with a DSP core, or any other such configuration). Thus, the functions described herein are implemented in hardware or software and are executed by a processor, firmware, or any combination thereof. If implemented in software executed by a processor, the functions are stored in the form of instructions or code on a computer-readable medium.

Computer-readable media includes both non-transitory computer storage media and communication media including any medium that facilitates transfer of code or data. A non-transitory storage medium is any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" can be based on both condition A and condition B. In other words, the phrase "based on" shall be construed to mean "based at least in part on." Also, the words "a" or "an" indicate "at least one."

What is claimed is:

1. A method for image processing, comprising:
identifying an original image including a plurality of semantic attributes, wherein a target attribute of the plurality of semantic attributes represents a complex set of features of the original image;
identifying a target attribute value that indicates a change to the target attribute of the plurality of semantic attributes;
computing a modified feature vector using a mapping network comprising a continuous normalizing flow (CNF) block that includes a non-linear activation function and that takes the target attribute value as input, wherein the modified feature vector incorporates the change to the target attribute while holding at least one preserved attribute of the plurality of semantic attributes unchanged; and
generating a modified image based on the modified feature vector using a generator network, wherein the modified image includes the change to the target attribute and retains the at least one preserved attribute from the original image.

2. The method of claim 1, further comprising:
identifying an original feature vector representing the original image;
identifying a plurality of original attribute values corresponding to original attributes based on the original image; and
computing a latent vector based on the original feature vector and the plurality of original attribute values.

3. The method of claim 2, further comprising:
applying the generator network to the original feature vector to obtain the original image.

4. The method of claim 2, further comprising:
applying a projection algorithm on the original image to obtain the original feature vector.

5. The method of claim 2, further comprising:
applying an attribute classifier to the original image to obtain the original attribute values.

6. The method of claim 1, further comprising:
generating an attribute vector including the target attribute value, wherein the attribute vector has fewer dimensions than the modified feature vector, and wherein the CNF block takes the attribute vector as input.

7. The method of claim 6, further comprising:
applying an inverse of the mapping network to the original feature vector to obtain a latent vector.

8. The method of claim 6, wherein:
the mapping network is trained jointly on a plurality of attributes.

9. The method of claim 1, wherein:
the original image comprises an image of a face, and the target attribute comprises a non-localized attribute including a facial expression, an orientation, an age, a lighting property, a gender, or a hairstyle.

10. The method of claim 1, further comprising:
receiving an input from a user indicating the target attribute value, wherein the input is received using an image editing application during editing of the original image; and
displaying the modified image to the user via the image editing application in response to the input.

11. A method for image processing, comprising:
identifying an original feature vector representing a plurality of original attributes;
identifying a plurality of original attribute values corresponding to the plurality of original attributes;
computing a latent vector based on the original feature vector and the plurality of original attribute values, wherein the latent vector is computed using an inverse of a mapping network;
identifying one or more target attribute values corresponding to one or more target attributes, wherein the one or more target attributes correspond to a subset of the plurality of original attributes and one or more preserved attribute values correspond to a remaining subset of the plurality of original attributes that do not correspond to the one or more target attributes;
computing a modified feature vector based on the latent vector using the mapping network, wherein the mapping network comprises a continuous normalizing flow (CNF) block that includes a non-linear activation function on the one or more target attribute values and the one or more preserved attribute values; and
generating a modified image based on the modified feature vector using a generator network, wherein the modified image includes the one or more target attributes and the remaining subset of the plurality of original attributes.

12. The method of claim 11, wherein:
the mapping network is trained jointly based on a plurality of attributes, and wherein the plurality of original attributes correspond to attributes used to train the mapping network.

13. The method of claim 11, wherein:
the mapping network is configured to enable changing the one or more target attributes while preserving the remaining subset of the plurality of original attributes by correcting for interconnection among the plurality of original attributes in the latent vector based on a non-linear dependency.

14. An apparatus for image processing, comprising:
a mapping network configured to produce a modified feature,
  wherein the mapping network comprises a continuous normalizing flow (CNF) block that includes a non-linear activation function and that takes a target attribute value as input, the target attribute value indicating a change to a target attribute of a plurality of semantic attributes of an original image, the target attribute representing a complex set of features of the original image, and
  wherein the modified feature vector incorporates the change to the target attribute while holding at least one preserved attribute of the plurality of semantic attributes unchanged; and
a generator network configured to generate a modified image based on the modified feature vector, wherein the modified image includes the change to the target attribute and retains the at least one preserved attribute from the original image.

15. The apparatus of claim 14, wherein:
the mapping network and the generator network are components of a generative adversarial network (GAN).

16. The apparatus of claim 14, wherein:
the mapping network and the generator network are components of a variational autoencoder (VAE).

17. The apparatus of claim 14, wherein:
the mapping network comprises one or more continuous normalizing flow (CNF) blocks.

18. The apparatus of claim 14, further comprising:
an attribute classifier configured to identify a plurality of attribute values based on an input image.

19. The apparatus of claim 14, wherein:
the mapping network implements an invertible function from a latent vector space to a feature vector space.

20. The apparatus of claim 14, wherein:
the mapping network and the generator network are trained using images of human faces.

* * * * *